United States Patent
Polk, Jr. et al.

(10) Patent No.: US 7,842,225 B2
(45) Date of Patent: *Nov. 30, 2010

(54) METHOD OF PREPARING A MOLDED ARTICLE

(75) Inventors: Dale E. Polk, Jr., Titusville, FL (US); Victor Wolynski, Cocoa, FL (US)

(73) Assignee: LRM Industries International, Inc., Rockledge, FL (US)

( * ) Notice: Subject to any disclaimer, the term of this patent is extended or adjusted under 35 U.S.C. 154(b) by 270 days.

This patent is subject to a terminal disclaimer.

(21) Appl. No.: 12/052,100

(22) Filed: Mar. 20, 2008

(65) Prior Publication Data

US 2008/0258354 A1   Oct. 23, 2008

Related U.S. Application Data

(60) Provisional application No. 60/925,570, filed on Apr. 20, 2007.

(51) Int. Cl.
*B29C 51/10* (2006.01)
*B29C 51/18* (2006.01)

(52) U.S. Cl. ..................... 264/554; 425/388
(58) Field of Classification Search ............... None
See application file for complete search history.

(56) References Cited

U.S. PATENT DOCUMENTS

| | | |
|---|---|---|
| 3,676,537 A | 7/1972 | Winstead |
| 3,931,383 A | 1/1976 | Erlewine et al. |
| 4,039,609 A | 8/1977 | Thiel et al. |
| 4,061,706 A | 12/1977 | Duffield et al. |

(Continued)

FOREIGN PATENT DOCUMENTS

GB   2101927   *   1/1983

(Continued)

*Primary Examiner*—Edmund H. Lee
(74) *Attorney, Agent, or Firm*—Michael A. Ervin; M.A. Ervin & Associates

(57) ABSTRACT

A method of forming a shaped thermoplastic sheet is described. The method includes providing a mold apparatus (1) that includes, a first mold portion (11) having an interior mold surface (14) having a plurality of perforations (26) and a perimeter edge (17). The mold apparatus (11) further includes at least one sheet retainer (35) having an upper surface (38) having a plurality of perforations (41) and a longitudinal axis (44) that is oriented along at least a portion of the perimeter edge (17) of the first mold portion (11). Each sheet retainer (35) is reversibly and controllably: (i) positionable along an x-, y- and/or z-axis relative to the perimeter edge (17); and (ii) rotatable around its longitudinal axis (44), toward and/or away from the perimeter edge (17). A heated thermoplastic sheet (95) is formed and contacted (while at a thermoformable temperature) with the interior surface (14) of the first mold portion (11) and the exterior surfaces (38) of the tubular sheet retainers (35). Reduced pressure is drawn through the perforations (41) of the sheet retainers (35) thereby retaining a portion of the heated thermoplastic sheet (95) thereon. The sheet retainers (35) are moved along the x-, y- and/or z-axes, and optionally rotated, with the sheet retained thereon, relative to the perimeter edge (17). The heated thermoplastic sheet (95) is allowed to cool, and a shaped thermoplastic sheet retaining the contour of interior mold surface (14) is formed.

18 Claims, 10 Drawing Sheets

U.S. PATENT DOCUMENTS

| | | | |
|---|---|---|---|
| 4,284,396 | A | 8/1981 | Thissen et al. |
| 4,421,712 | A | 12/1983 | Winstead |
| 4,508,670 | A | 4/1985 | Janke |
| 4,722,820 | A | 2/1988 | Flecknoe-Brown |
| 4,994,229 | A | 2/1991 | Flecknoe-Brown |
| 5,106,567 | A | 4/1992 | Demerest |
| 5,162,124 | A | 11/1992 | Hausler et al. |
| 5,314,325 | A | 5/1994 | Bosler |
| 5,783,229 | A | 7/1998 | Manlove |
| 5,829,980 | A | 11/1998 | Sheridan et al. |
| 6,086,800 | A | 7/2000 | Manlove |
| 6,294,114 | B1 | 9/2001 | Muirhead |
| 6,394,783 | B1 | 5/2002 | Dalgewicz, III et al. |
| 6,719,551 | B2 | 4/2004 | Polk, Jr. |
| 6,814,905 | B1 | 11/2004 | Dalgewicz et al. |
| 6,869,558 | B2 | 3/2005 | Polk, Jr. et al. |
| 6,900,547 | B2 | 5/2005 | Polk, Jr. et al. |
| 7,008,213 | B2 | 3/2006 | King |
| 2004/0253429 | A1 | 12/2004 | Polk, Jr. et al. |
| 2004/0253430 | A1 | 12/2004 | Polk, Jr. et al. |
| 2005/0040569 | A1 | 2/2005 | Fitzell, Jr. |
| 2006/0008967 | A1 | 1/2006 | Polk, Jr. et al. |

FOREIGN PATENT DOCUMENTS

| | | | |
|---|---|---|---|
| JP | 61104821 | * | 5/1986 |
| JP | 61104822 | * | 5/1986 |

* cited by examiner

METHOD OF PREPARING A MOLDED ARTICLE

CROSS REFERENCE TO RELATED PATENT APPLICATION

The present nonprovisional patent application is entitled to and claims, under 35 U.S.C. §119(e), the benefit of U.S. Provisional Patent Application Ser. No. 60/925,570, filed Apr. 20, 2007, which is hereby incorporated herein in its entirety by reference.

FIELD OF THE INVENTION

The present invention relates to a method of preparing a molded article, and more particularly to a method of forming a shaped thermoplastic sheet. The method includes providing a mold apparatus that includes a first mold portion having a contoured and perforated interior mold surface, and a perimeter edge, and at least one sheet retainer having a perforated upper surface. The sheet retainer has a longitudinal axis that is oriented along at least a portion of the perimeter edge, and is reversibly and controllably positionable along an x-, y- and/or z-axis relative to the perimeter edge. The sheet retainer is also reversibly and controllably rotatable around its longitudinal axis. A heated thermoplastic sheet, which is formed from a thermoplastic composition, is contacted with and retained on the upper surface of the sheet retainer by reduced pressure drawn through its perforated upper surface. Reduced pressure is drawn through the perforations of the interior mold surface, and the heated thermoplastic sheet is resultantly drawn into contact therewith, so as to match the contour thereof. The sheet retainer, with the heated thermoplastic sheet retained thereon, is moved and optionally rotated towards and/or away from the perimeter edge prior to, concurrently with and/or subsequently to drawing the heated thermoplastic sheet into contact with the interior mold surface. Such movement of the sheet retainer assists contact of and contouring of the heated thermoplastic sheet with the interior mold surface. The present invention also relates to a mold apparatus that includes the first mold portion and the sheet retainer(s).

BACKGROUND OF THE INVENTION

Single sheet thermoforming processes typically involve providing a preformed sheet of thermoplastic material (usually on a roll), heating the preformed thermoplastic sheet to a thermoformable temperature, and contacting the heated thermoplastic sheet with a shaped mold surface. The heated thermoplastic sheet is typically drawn into contact with the shaped mold surface by means of a vacuum being drawn through perforations in the mold surface.

Such prior art methods of single sheet thermoforming typically and undesirably involve multiple steps, such as separately forming the thermoplastic sheet, collecting the preformed thermoplastic sheet on a roll, shipping the roll of preformed thermoplastic sheet to a molder (or fabricator), and re-heating the preformed thermoplastic sheet prior to the thermoforming operation. In addition, such prior art methods of single sheet thermoforming also typically do not provide sufficient control of the thermoplastic sheet thickness over contoured (e.g., recessed) mold surfaces. For example, the molded thermoplastic sheet may be too thin (e.g., in deep drawn areas), and/or too thick in other areas. Such variability in molded sheet thickness may result in the final molded article having undesirably variable physical properties, such as crack failure, and aesthetic properties, such as an uneven visual appearance (e.g., irregular color).

Thermoforming processes that involve the continuous extrusion of a thermoplastic sheet, that is thermoformed using residual heat from the extruded thermoplastic sheet are known. See, for example, U.S. Pat. Nos. 6,814,905 B1, 6,086,800 and 4,061,706. Such continuous thermoforming methods, while perhaps addressing or eliminating some of the multiple steps involved with the use of preformed thermoplastic sheets, typically and undesirably do not provide sufficient control of the thermoplastic sheet thickness over contoured (e.g., recessed) mold surfaces.

It would be desirable to develop new thermoforming processes, and apparatuses used therewith, that minimize or eliminate the steps typically encountered with prior art methods. In addition, it would be further desirable that such newly developed methods and apparatae also provide improved control of the thickness of the molded thermoplastic sheet as it is formed and molded over contoured mold surfaces.

SUMMARY OF THE INVENTION

In accordance with the present invention, there is provided a method of preparing a molded article comprising:

(a) providing a mold apparatus comprising,
  (i) a first mold portion having an interior mold surface, and a perimeter edge, said interior mold surface having a contour and a plurality of perforations, and
  (ii) at least one sheet retainer having an upper surface, at least a portion of the upper surface of said sheet retainer having a plurality of perforations, said sheet retainer having a longitudinal axis that is oriented along at least a portion of said perimeter edge, said sheet retainer being reversibly and controllably positionable along at least one of an x-axis, a y-axis and a z-axis relative to said perimeter edge, and said sheet retainer being rotatable around said longitudinal axis;

(b) positioning said sheet retainer such that the upper surface of said sheet retainer is located above said perimeter edge;

(c) forming, from at least one thermoplastic composition, a heated thermoplastic sheet having a temperature that allows said heated thermoplastic sheet to be thermoformable, said heated thermoplastic sheet having a first surface and a second surface;

(d) contacting a first portion of said second surface of said heated thermoplastic sheet with at least a portion of the upper surface of said sheet retainer;

(e) drawing reduced pressure through said plurality of perforations of said upper surface of said sheet retainer, thereby retaining said first portion of said second surface of said heated thermoplastic sheet on the upper surface of said sheet retainer;

(f) contacting a second portion of the second surface of said heated thermoplastic sheet with at least a portion of the interior mold surface of said first mold portion;

(g) (i) moving each sheet retainer independently at least one of towards said perimeter edge and away from said perimeter edge, in each case independently along at least one of said x-axis, said y-axis and said z-axis, and
  (ii) optionally rotating each sheet retainer, around said longitudinal axis of said sheet retainer, independently at least one of towards said perimeter edge and away from said perimeter edge;

(h) drawing reduced pressure through said plurality of perforations of said interior mold surface of said first mold portion, such that said second portion of said second surface of said heated thermoplastic sheet substantially matches said contour of said interior mold surface of said first mold portion;

(i) cooling said heated thermoplastic sheet thereby forming a shaped thermoplastic sheet that retains said contour of said interior mold surface of said first mold portion; and (j) removing said shaped thermoplastic sheet from said first mold portion, wherein said shaped thermoplastic sheet is said molded article.

In further accordance with the present invention, there is also provided a sheet molding apparatus comprising:

(a) a first mold portion having an interior mold surface, and a perimeter edge, said interior mold surface having a contour and a plurality of perforations;

(b) a first vacuum apparatus that is in fluid communication with said first mold portion, said first vacuum apparatus controllably drawing reduced pressure through said plurality of perforations of said interior mold surface of said first mold portion;

(c) at least one sheet retainer having an upper surface, the upper surface of said sheet retainer having a plurality of perforations, said sheet retainer having a longitudinal axis that is oriented along at least a portion of said perimeter edge; and (d) a second vacuum apparatus that is in fluid communication with said sheet retainer, said second vacuum apparatus controllably drawing reduced pressure through said plurality of perforations of said upper surface of said sheet retainer, wherein said sheet retainer is reversibly and controllably positionable along at least one of an x-axis, a y-axis and a z-axis relative to said perimeter edge, and said sheet retainer is rotatable around said longitudinal axis, further wherein, said upper surface of said sheet retainer is dimensioned to retain a first portion of a second surface of a heated thermoplastic sheet on the upper surface of said sheet retainer, when said second surface of said first portion of said heated thermoplastic sheet is contacted with said upper surface of said sheet retainer and reduced pressure is drawn through said plurality of perforations of the upper surface of said sheet retainer, and reversible positioning of said sheet retainer along at least one of said x-axis, said y-axis and said z-axis relative to said perimeter edge, and optional reversible rotation of said sheet retainer around said longitudinal axis, with said first portion of said second surface of a heated thermoplastic sheet being retained on the upper surface of said sheet retainer, assists a second portion of said second surface of said heated thermoplastic sheet being drawn to and matching the contour of said interior mold surface of said first mold portion when said second surface of said second portion of said heated thermoplastic sheet is contacted with said interior mold surface of said first mold portion and reduced pressure is drawn through said plurality of perforations of said interior mold surface of said first mold portion.

The features that characterize the present invention are pointed out with particularity in the claims, which are annexed to and form a part of this disclosure. These and other features of the invention, its operating advantages and the specific objects obtained by its use will be more fully understood from the following detailed description and accompanying drawings in which preferred embodiments of the invention are illustrated and described.

As used herein and in the claims, terms of orientation and position, such as "upper", "lower", "inner", "outer", "right", "left", "vertical", "horizontal", "top", "bottom", and similar terms, are used to describe the invention as oriented in the drawings. Unless otherwise indicated, the use of such terms is not intended to represent a limitation upon the scope of the invention, in that the invention may adopt alternative positions and orientations.

Unless otherwise indicated, all numbers or expressions, such as those expressing structural dimensions, quantities of ingredients, etc., as used in the specification and claims are understood as modified in all instances by the term "about".

BRIEF DESCRIPTION OF THE DRAWINGS

In FIGS. 1 through 10, like reference numerals designate the same components and structural features, unless otherwise indicated.

DETAILED DESCRIPTION OF THE INVENTION

Figure 1:
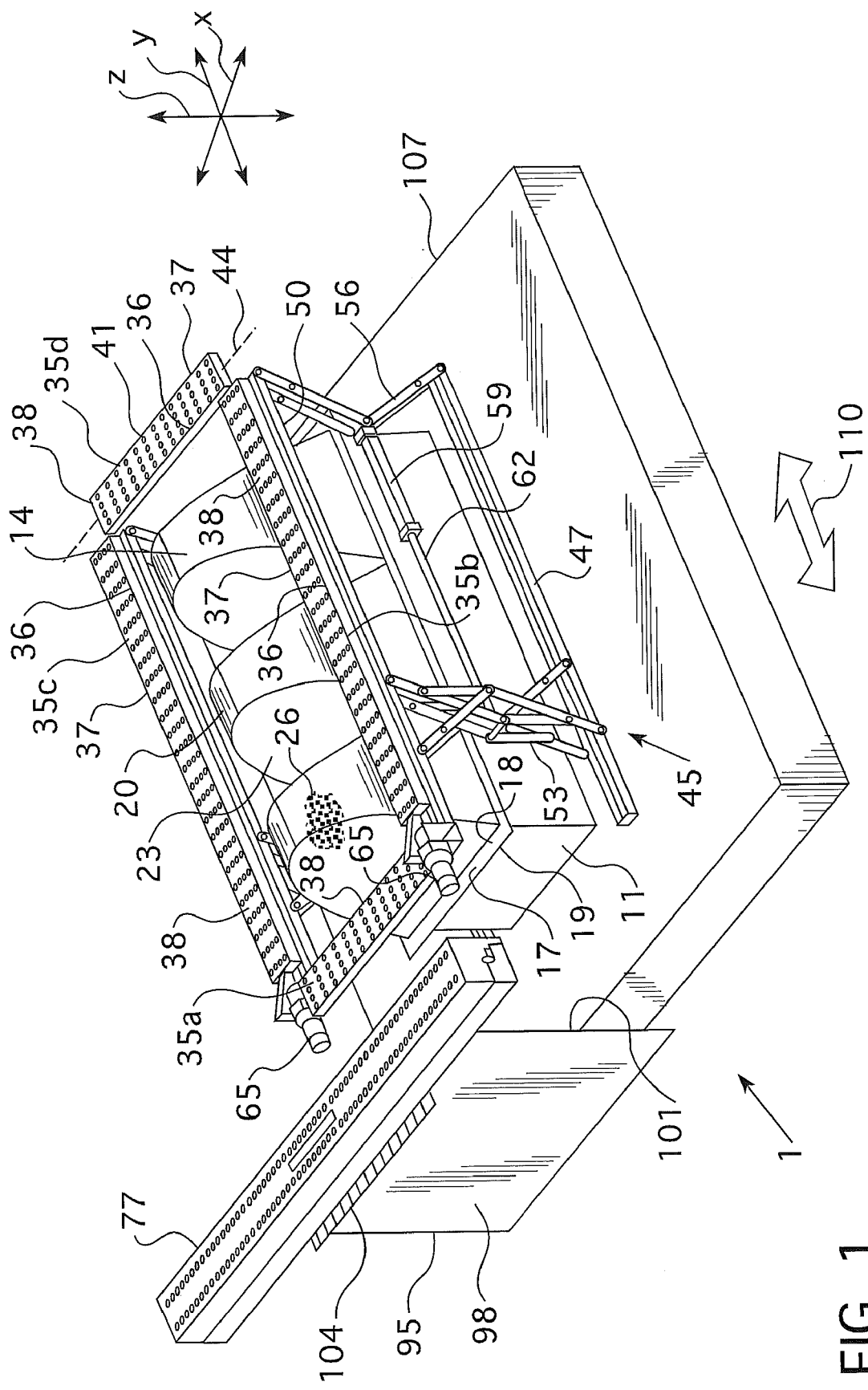
FIG. 1 is a representative perspective view of a sheet molding apparatus according to the present invention, with a heated thermoplastic sheet emerging from the sheet die.
Figure 2:
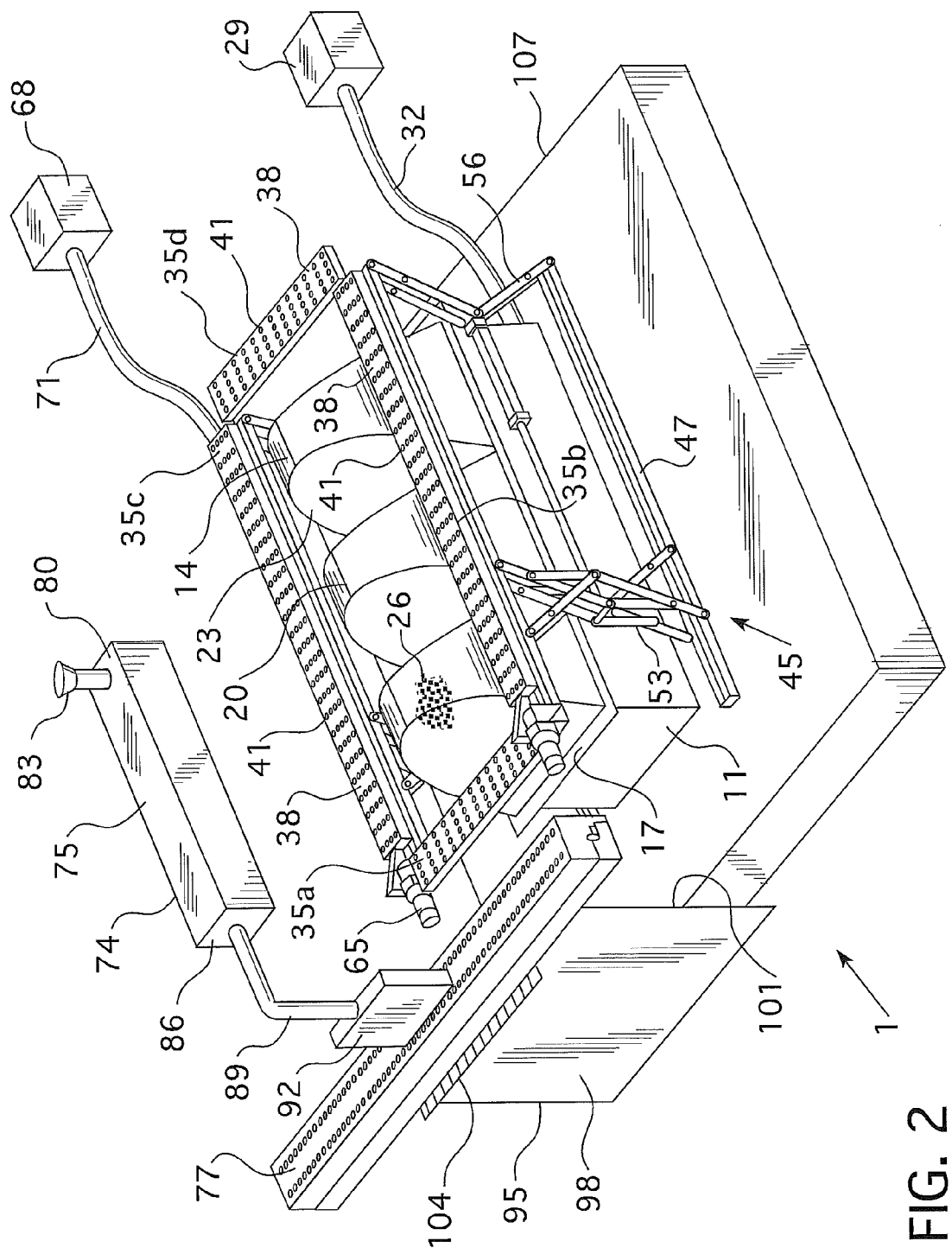
FIG. 2 is a representative perspective view of the sheet molding apparatus of FIG. 1, further including an extruder and separate vacuum pumps for the first mold portion and the sheet retainers.

With reference to FIGS. 1 and 2, the method of the present invention involves providing a mold apparatus 1, and more particularly a sheet molding apparatus 1, that includes a first mold portion 11 having an interior mold surface 14 and a perimeter edge 17. Interior mold surface 14 has a contour and a plurality of perforations 26. The contour of interior mold surface 14 may include, for example, raised portions 20 and/or recessed portions 23. Interior mold surface 14 may be a substantially recessed or female interior mold surface (not shown), in which case it resides substantially below perimeter edge 17. Alternatively, interior mold surface 14 may be a substantially raised or male interior mold surface (as depicted), in which case a majority of interior mold surface 14 resides above perimeter edge 17. In addition, interior mold surface 14 may include relatively shallow (e.g., relative to raised portions 20 and recessed portions 23) raised and/or recessed patterns (not shown), such as grooves, for purposes of providing the surface of the molded article with texture and/or molded-in indicia.

Perimeter edge 17 typically defines the terminal extent of first mold portion 11 beyond which heated thermoplastic sheet, if any, extending there-beyond does not form a portion of the final molded article. Typically, thermoplastic sheet, if any, extending beyond perimeter edge 17 is removed (e.g., cut away) from the final molded article. Perimeter edge 17 may have any suitable shape, such as rounded, polygonal, irregular or combinations thereof. As depicted in the drawings, perimeter edge 17 is in the form of a substantially horizontal shelf having an upper surface 18 and a terminal edge 19.

For purposes of clarity, the plurality of perforations 26 are only depicted in FIGS. 1 and 2, and only over a portion of interior mold surface 14. Perforations 26 may be located over substantially the entirety of interior mold surface 14 or in zones (or clusters). Perforations 26 may be arranged substantially uniformly or non-uniformly (e.g., randomly) over interior mold surface 14. If located in zones, portions of interior mold surface 14 may be free of perforations. The plurality of perforations are typically arranged (or located) uniformly over substantially the entirety of interior mold surface 14.

The plurality of perforations are in fluid communication with at least one vacuum apparatus, such as a vacuum pump. Typically, first mold portion 11 has at least one interior chamber (not shown) that is in fluid communication with the plurality of perforations 26 and at least one vacuum apparatus, for example, first vacuum apparatus 29 by means of conduit 32, as depicted in FIG. 2. Conduit 32 may be a rigid conduit, but more typically is fabricated from a flexible material that may be reversibly coiled. First vacuum apparatus 29 controllably draws reduced pressure through the plurality of perforations in interior mold surface 14. For example, the reduced pressure drawn through perforations 26 may be ramped in stages with at least one pressure plateau, or the reduced pressure may be drawn at the full capacity of vacuum apparatus 29 from the instant it is turned on.

To assist removing the molded article from first mold portion 11, a gas (e.g., air) may be passed out of perforations 26 at elevated pressure (i.e., at a pressure greater than ambient atmospheric pressure). To pass a gas, such as air, at elevated pressure out through perforations 26, first vacuum apparatus 29 may be operated in reverse, and/or a separate pressure pump (not shown) may be used in fluid communication with the internal chamber and correspondingly perforations 26 of first mold portion 11. In addition, the gas passed out of perforations 26 may be cooled to a temperature less than ambient temperature (e.g., a temperature less than 25° C., such as 5° C. to 15° C.) to further assist cooling the heated thermoplastic sheet, such that it retains the contour shape of interior mold surface 14.

The plurality of perforations in interior mold surface 14 may have any suitable shape and dimension, provided they: (i) are not fouled, occluded or otherwise clogged with thermoplastic material when the molded article is removed from first mold portion 11; and (ii) do not result in undesirable surface features or defects on the final molded article (e.g., plastic nubs extending therefrom). The perforations in interior mold surface 14 may have cross-sectional shapes selected from polygonal shapes (e.g., triangles, rectangles, squares, pentagons, hexagons, heptagons, octagons, etc., and combinations thereof), circles, ovals, irregular shapes, and combinations thereof. Typically, the perforations of interior mold surface 14 have substantially circular cross-sectional shapes having diameters of from 0.1 mm to 7 mm, more typically from 0.5 mm to 5 mm, and further typically from 1 mm to 3 mm. In an embodiment of the present invention, the perforations of interior mold surface 14 have substantially circular cross-sectional shapes having diameters of 1.6 mm (1/16 inch).

The sheet molding apparatus of the present invention also includes at least one sheet retainer. As depicted in the drawings, sheet molding apparatus 1 includes four sheet retainers, 35a, 35b, 35c and 35d, which may be referred to herein collectively and individually as sheet retainer 35. Each sheet retainer 35 has an upper surface 38, and a longitudinal axis 44. At least a portion of upper surface 38 of each sheet retainer has a plurality of perforations 41. Longitudinal axis 44 of each sheet retainer 35 is oriented along (e.g., substantially parallel with) at least a portion of perimeter edge 17 of first mold portion 11. As depicted in the drawings, sheet retainers 35a, 35b, 35c and 35d are positioned and oriented so as to substantially encompass the totality of perimeter edge 17.

Each sheet retainer 35 is reversibly and controllably positionable along an x-axis, a y-axis and/or a z-axis relative to perimeter edge 17 of first mold portion 14 (FIG. 1). For purposes of illustration, as depicted in FIGS. 1 and 2, each sheet retainer is initially positioned above (along the positive z-axis), and outward from (along the positive x-axis) relative to perimeter edge 17. Each sheet retainer 35 is reversibly and controllably positionable along the z-axis (e.g., up and down) relative to perimeter edge 17 by suitable means. The sheet retainer may be reversibly and controllably positionable by art-recognized means. For example, each sheet retainer 35 may rest fixedly on one or more pistons (not shown) that are reversibly and controllably positionable along the z-axis.

Figure 3:
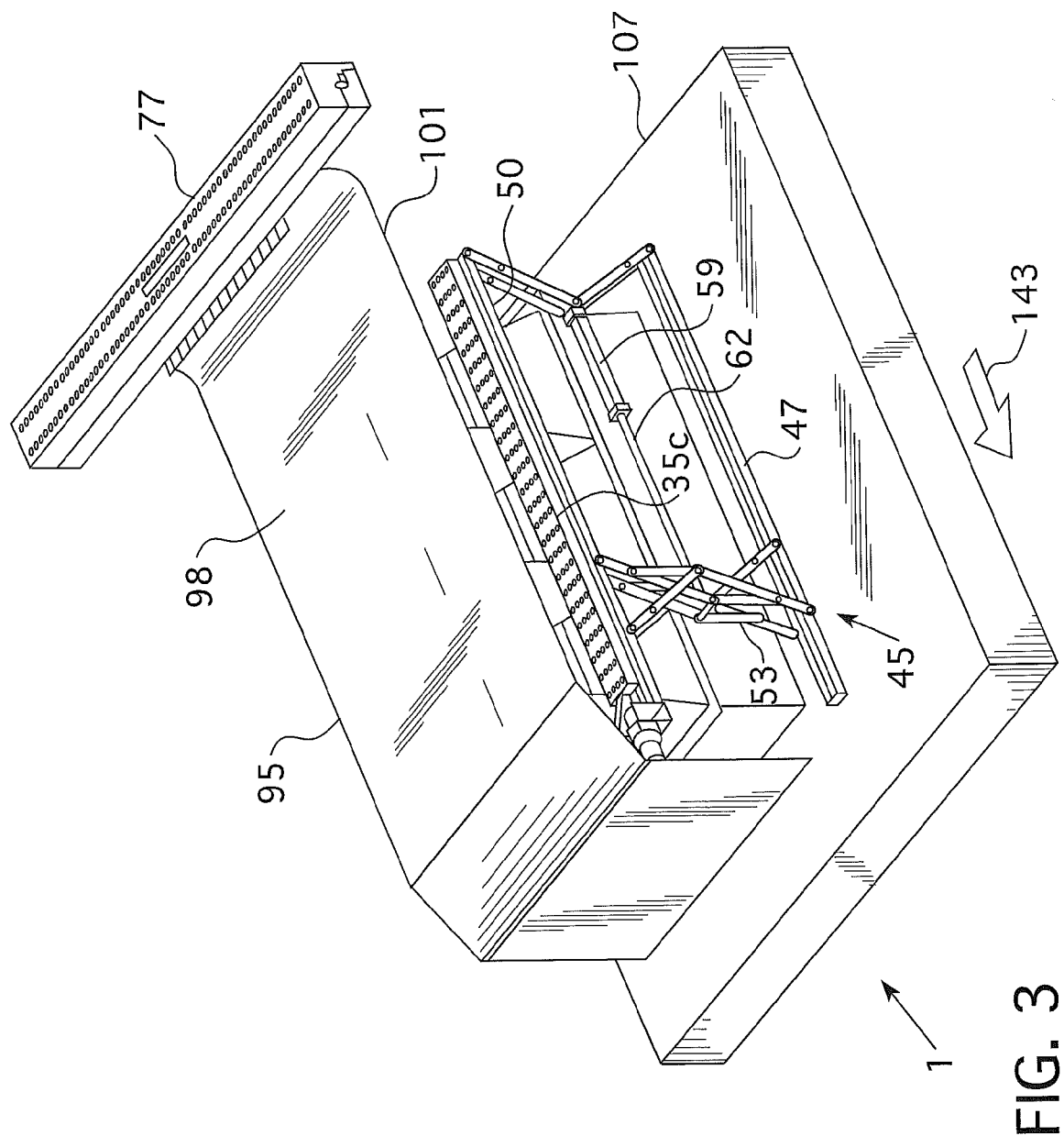
FIG. 3 is a representative perspective view of the sheet molding apparatus of FIG. 1, in which the heated thermoplastic sheet extends across the first mold portion and the sheet retainers.

Each sheet retainer 35 may rest fixedly on one or more scissor jacks that are reversibly and controllably positionable along the z-axis, and optionally the y-axis. As depicted in FIGS. 1, 2 and 3, sheet retainers 35b and 35c each reside on a scissor jack apparatus 45 that includes a base 47, a top plate 50 that is connected to sheet retainer 35b (equivalently for 35c), a first scissor jack element 53 and a second scissor jack element 56. The first 53 and second 56 scissor jack elements are connected to base plate 47 and top plate 50. The first 53 and second 56 scissor jack elements may be operated independently or in unison. If the scissor jack elements are operated independently, different portions of the sheet retainers may be raised or lowered at different times. In an embodiment of the present invention, the first 53 and second 56 scissor jack elements are operated in unison by means of a piston 59 and rod 62 apparatus extending laterally and connectedly between the scissor jack elements. When rod 62 is drawn within piston 59, the first 53 and second 56 scissor jack elements collapse, and the sheet retainer attached to upper plate 50 moves downward along the z-axis. Alternatively, when rod 62 is driven out of piston 59, the first 53 and second 56 scissor jack elements open up (e.g., expand, extending outward or upward), and the sheet retainer attached to upper plate 50 moves upward along the z-axis.

Sheet retainers 35b and 35c each reside on a separate scissor jack apparatus 45. The remaining sheet retainers 35a and 35d, as depicted, do not rest directly on a scissor jack apparatus, but are each attached to sheet retainers 35b and 35c, and correspondingly as sheet retainer 35b and 35c move in the z-axis, so do sheet retainers 35a and 35d. Alternatively, and as discussed previously, each sheet retainer 35 may move independently of each other sheet retainer along the x-, y- and/or z-axis.

As is known to the skilled artisan, scissor jacks (e.g., partial scissor jacks such as scissor jack element 56) may be employed and oriented so as to move an article resting thereon, such as a sheet retainer 35, along both the z-axis and y-axis as they are collapsed and/or extended. A sheet retainer may be reversibly and controllably moveable independently along the x-axis and/or y-axis relative to perimeter edge 17 by art-recognized means and methods. For example, base plate 47 of scissor jack apparatus 45 may be reversibly and controllably moveably on rails (not shown) oriented along the x-axis and/or the y-axis relative to perimeter edge 17.

In addition to being reversibly and controllably positionable along the x-, y- and/or z-axes relative to perimeter edge 17, each sheet retainer 35 is independently rotatable around its longitudinal axis (e.g., longitudinal axis 44). Each sheet retainer 35 may be reversibly and controllably rotatable about its longitudinal axis 44 away from and/or towards perimeter edge 17. Reversible and controllable rotation of each sheet retainer 35 around its longitudinal axis 44 may be achieved by art-recognized means and methods. For example, in FIGS. 1 and 3, sheet retainers 35b and 35c are each independently engaged with a motor 65 that rotates them each controllably and reversibly about their respective longitudinal axes 44. The remaining sheet retainers may also be independently attached to additional motors (not shown). Alternatively, rotation of sheet retainers 35b and 35c may be translated or transferred correspondingly into rotation of sheet retainers 35a and 35b by means of intermeshing transfer gears (not shown), as is known to the skilled artisan.

The plurality of perforations 41 of upper surface 38 of each sheet retainer 35 may be arranged over the entirety or over portions (e.g., in zones) of upper surface 38. Perforations 41 may be arranged substantially uniformly, non-uniformly (e.g., randomly), or in patterns over upper surface 38. If located in zones, portions of upper surface 38 of sheet retainer 35 may be free of perforations. Perforations 41 may be positioned or located in zones on upper sheet retainer surface 38 for purposes of differential pulling or stretching of the heated thermoplastic sheet retained thereon. For example, the heated thermoplastic sheet being pulled or stretched by/on those sheet retainer zones having perforations, and not being pulled or stretched by/on those sheet retainer zones that are free of perforations. Such differential pulling or stretching of the heated thermoplastic sheet during the molding process may be desirable for reasons including, but not limited to, controlling the thickness of the heated thermoplastic sheet over different areas of the interior surface 14 of first mold portion 11. In those areas subjected to pulling or stretching by the sheet retainer (due to the presence of perforations in an upper surface zone of the sheet retainer having reduced pressure drawn there-through), the heated thermoplastic sheet will typically be thinner over interior surface 14 of first mold portion 11. Correspondingly, in those areas not subjected to pulling or stretching (due to an absence of perforations in the upper surface of that zone of the sheet retainer), the heated thermoplastic sheet will typically be thicker over interior surface 14 of first mold portion 11.

The plurality of perforations 41 are typically arranged (or located) uniformly over substantially the entirety of upper surface 38 of each sheet retainer 35. As depicted in the drawing figures, perforations 41 are arranged substantially uniformly in rows or line in upper surface 38 of each sheet retainer 35.

The plurality of perforations 41 of each sheet retainer 35 are in fluid communication with at least one vacuum apparatus, such as a vacuum pump. Typically, each sheet retainer has at least one interior chamber (not shown) that is in fluid communication with the plurality of perforations 41 and at least one vacuum apparatus, for example second vacuum apparatus 68 by means of conduit 71, as depicted in FIG. 2. For purposes of clarity, only sheet retainer 35c is depicted as being in fluid communication with second vacuum apparatus 68. Each sheet retainer may be in fluid communication with a separate second vacuum apparatus, or they may each be in fluid communication with the same second vacuum apparatus. Conduit 71 may be a rigid conduit, but more typically is fabricated from a flexible material that may be reversibly coiled. Second vacuum apparatus 68 controllably draws reduced pressure through the plurality of perforations 41 of exterior sheet retainer surface 38. For example, the reduced pressure drawn through perforations 41 may be ramped in stages with at least one pressure plateau, or the reduced pressure may be drawn at the full capacity of second vacuum apparatus 68 from the instant it is turned on.

Typically, after the process of molding the molded article is complete, the heated thermoplastic sheet is removed from the sheet retainers. To assist removing the heated thermoplastic sheet from each sheet retainer 35, a gas (e.g., air) may be passed out of perforations 41 at elevated pressure (i.e., at a pressure greater than ambient atmospheric pressure). To pass a gas, such as air, at elevated pressure out through perforations 41, second vacuum apparatus 68 may be operated in reverse, and/or a separate pressure pump (not shown) may be used in fluid communication with the internal chamber and correspondingly perforations 41 of sheet retainer 35. In addition, the gas passed out of perforations 41 may be cooled to a temperature less than ambient temperature (e.g., a temperature less than 25° C., such as 5° C. to 15° C.) to further assist cooling and removal of the heated thermoplastic sheet from the sheet retainers 35.

The plurality of perforations 41 in upper surface 38 of each sheet retainer 35 may have any suitable shape and dimension, provided they are not fouled, occluded or otherwise clogged with thermoplastic material that is retained thereon during mold formation of the final molded article. Since the thermoplastic material retained on the sheet retainers 35 typically does not form a part of the final molded article, the formation of surface features (such as extended plastic nubs) thereon by the perforations 41 of the sheet retainers 35 is typically not a concern. As such, perforations 41 of the sheet retainers 35 may be larger than the perforations 26 of interior mold surface 14 of first mold portion 11. The perforations 41 of upper surface 38 of each sheet retainer 35 may have cross-sectional shapes selected from polygonal shapes (e.g., triangles, rectangles, squares, pentagons, hexagons, heptagons, octagons, etc., and combinations thereof), circles, ovals, irregular shapes, and combinations thereof. Typically, the perforations 41 of upper surface 38 of each sheet retainer 35 have substantially circular cross-sectional shapes having diameters of from 0.1 mm to 7 mm, more typically from 0.5 mm to 6 mm, and further typically from 1 mm to 4 mm. In an embodiment of the present invention, the perforations 41 of upper surface 38 of each sheet retainer 35 have substantially circular cross-sectional shapes having diameters of 1.6 mm (1/16 inch) or 3.2 mm (1/8 inch).

Each sheet retainer may have any suitable shape (e.g., cross sectional shape), provided the sheet retainer has an upper surface having a plurality of perforations, and the upper surface is sufficiently dimensioned to receive and retain (via reduced pressure drawn through perforations 41) a first portion of the second surface of the heated thermoplastic sheet thereon. As used herein and in the claims, the term "upper surface" of the sheet retainer according to the present invention means any surface(s) of the sheet retainer that faces towards the second surface of the heated thermoplastic sheet, as the heated thermoplastic sheet is formed. If the sheet retainers (and first mold portion) are oriented substantially horizontally (e.g., in a plane beneath the sheet die) during the sheet molding process, the upper surfaces of the sheet retainer face upward, and may be further described as forming an angle relative to horizontal of from 0° to less than 90°. The upper surface of the sheet retainer may comprise a plurality of upper surfaces (e.g., in the case of a polygonal upper surface or a tubular sheet retainer having a polygonal cross-section).

The sheet retainer of the present invention may comprise at least one further surface, each further surface being other than the upper surface(s) of the sheet retainer, and each further surface being substantially free of perforations (i.e., perforations through which reduced pressure may be drawn).

In an embodiment of the present invention, at least one sheet retainer is a tubular sheet retainer having an upper surface at least a portion of which has a plurality of perforations (through which reduced pressure may be drawn), and all remaining exterior surfaces (i.e., further surfaces) of the tubular sheet retainer (that are other than the upper surface) are substantially free of perforations (through which reduced pressure may be drawn). Each tubular sheet retainer may have a cross-sectional shape selected independently from polygonal shapes (e.g., triangles, rectangles, squares, pentagons, hexagons, heptagons, octagons, etc., and combinations thereof), circles, ovals (e.g., elliptical shapes), irregular shapes, and combinations thereof. Typically, each tubular sheet retainer has a substantially circular cross sectional shape, and accordingly each tubular sheet retainer is a substantially cylindrical sheet retainer. The upper surface of the cylindrical sheet retainer (i.e., no more than the upper 50% of the surface area of the cylindrical sheet retainer's exterior surface area) has a plurality of perforations, and the remaining surface area thereof is free of perforations.

Figure 10:
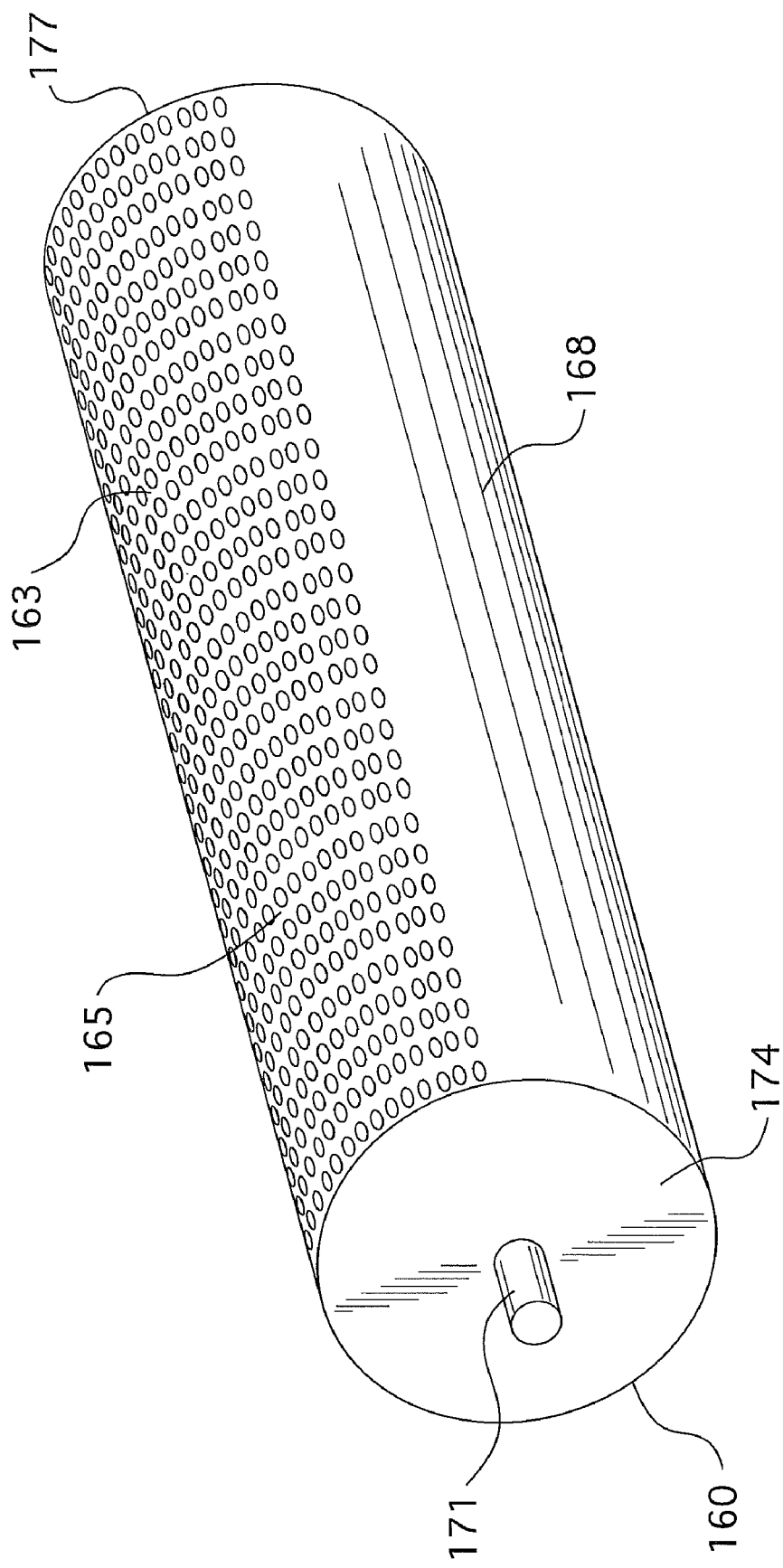
FIG. 10 is a representative perspective view of a tubular sheet retainer that may be used with the sheet molding apparatus and in the method of the present invention.

With reference to FIG. 10, a tubular sheet retainer 160 having a substantially circular cross-section, is depicted. At least one sheet retainer 35 of mold apparatus 1 may be replaced with tubular sheet retainer 160. Tubular sheet retainer 160 has an upper surface 163, which has a plurality of perforations 165. Tubular sheet retainer 160 also has a lower surface 168 that is substantially free of perforations (and which is accordingly a further surface of the tubular sheet retainer). Upper surface 163 typically comprises 50 percent or less (but greater than 0 percent) of the total exterior cylindrical surface area of tubular sheet retainer 160 (e.g., from 1 to 50, 10 to 50 or 25 to 50 percent of total exterior cylindrical surface area). Lower surface 168 typically comprises 50 percent or more (but less than 100 percent) of the total exterior cylindrical surface area of tubular sheet retainer 160 (e.g., from 50 to 99, 50 to 90 or 50 to 75 percent of total exterior cylindrical surface area). The total exterior cylindrical surface area of tubular sheet retainer 160 is equal to the sum of the surface area of upper surface 163 and lower surface 168. As depicted in FIG. 10, upper surface 163 and lower surface 168 each substantially comprise or form substantially 50 percent of the total cylindrical exterior surface area of tubular sheet retainer 160. As depicted, tubular sheet retainer 160 also includes a first endplate 174 having a first shaft 171 extending therefrom. Tubular sheet retainer 160 also has a second endplate 177 (not visible in FIG. 10), at the end opposite first endplate 174, having a second shaft extending therefrom (not shown or visible in FIG. 10). The first and second shafts may be used to support and rotate tubular sheet retainer 160 around its longitudinal axis.

In a further embodiment of the present invention, each sheet retainer independently has a substantially plate (or plate-like) shape, and accordingly is a plate sheet retainer. The sheet retainers 35a, 35b, 35c and 35d of the drawing figures are plate sheet retainers. Each plate sheet retainer has an interior edge 36 and an exterior edge 37. The plate sheet retainers 35 are oriented and positioned such that interior edge 36 is closer to perimeter edge 17, and outer edge 37 is further from perimeter edge 17 (relative to interior edge 36).

The plate sheet retainer may have any suitable shape, relative to a top plan view thereof (i.e., looking directly down on, or orthogonally towards, the upper surface thereof), provided the upper surface of the plate sheet retainer is capable of receiving and retaining the first portion of the second surface of the heated thermoplastic sheet thereon. For example, each plate sheet retainer may have a shape, relative to a top plan view thereof, selected independently from polygonal shapes (e.g., triangles, rectangles, squares, pentagons, hexagons, heptagons, octagons, etc., and combinations thereof), circles, ovals (e.g., elliptical shapes), irregular shapes, and combinations thereof. Typically, the plate sheet retainers of the present invention have a shape, relative to a top plan view thereof, selected from substantially square and/or rectangular shapes, and in particular from substantially rectangular shapes (as depicted in the drawing figures—sheet retainers 35).

The upper surface of the sheet retainers may each independently have a contour selected from flat contours, convex contours, concave contours and combinations thereof. In an embodiment of the present invention, the upper surface of each sheet retainer independently has a substantially flat contour (e.g., as depicted in the drawings with regard to upper surface 38 of sheet retainers 35).

The upper surface of the each sheet retainer is dimensioned so as to retain a first portion of the second surface of the heated thermoplastic sheet thereon, as will be discussed in further detail herein. The dimensions of the upper surface of the sheet retainer are typically selected such that the heated thermoplastic sheet is both sufficiently retained thereon, and rotation of the sheet retainer around its longitudinal axis sufficiently pulls/stretches or slacks the sheet (whether it is rotated away or towards the perimeter edge). Typically, the upper surface of each sheet retainer is independently dimensioned so as to have a surface area of from 155 $cm^2$ to 20,439 $cm^2$ (24 to 3168 $inches^2$), more typically from 619 $cm^2$ to 18,581 $cm^2$ (96 to 2880 $inches^2$), and further typically from 1394 $cm^2$ to 4065 $cm^2$ (216 to 630 $inches^2$). In an embodiment, the upper surface of each sheet retainer has a surface area of approximately 3716 $cm^2$ (576 $inches^2$).

The sheet retainers may have any suitable length, provided they extend along at least a portion of the perimeter edge of the first mold portion. Typically, each sheet retainer has a length of from 91 cm to 609 cm (3 to 20 feet), more typically from 122 cm to 457 cm (4 to 15 feet), and further typically from 182 cm to 304 cm (6 to 10 feet). In an embodiment, plate sheet retainers 35a and 35d each have a length of 122 cm (4 feet), and plate sheet retainers 35c and 35b each have a length of 244 cm (8 feet).

The sheet retainers may have any suitable width (or diameter), provided the upper surface thereof is sufficiently dimensioned so as to retain a first portion of the second surface of the heated thermoplastic sheet thereon. In the case of plate sheet retainers, the plate sheet retainers typically have a width of from 2.5 cm to 30.5 cm (1 to 12 inches), more typically from 10.2 cm to 20.3 cm (4 to 8 inches), and further typically from 12 cm to 18 cm (4.7 to 7 inches). In a particular embodiment, the plate sheet retainers have a width of 15.2 cm (6 inches).

The sheet retainers may be fabricated from any suitable rigid material. For example, each sheet retainer may be fabricated from metals, thermoset plastic materials, thermoplastic materials, ceramic materials and combinations thereof. Typically the sheet retainers are fabricated from metals (e.g., steel), and the upper surfaces thereof are formed from polished metal.

The sheet molding apparatus of the present invention may further include an extruder 74 and a sheet die 77 (FIG. 2). The extruder includes a feed end 80 having a feed port 83, and a terminal end 86. Extruder 74 may be selected from single screw, or counter- or co-rotating twin screw extruders that are known to the skilled artisan. Extruder 74 typically includes one or more heated zones along the length of its barrel 75, the temperature(s) of which is controllable. A thermoplastic composition, typically comprising at least one thermoplastic polymer and optionally one or more additives (e.g., glass fibers and/or antioxidants), is introduced into feed port 83, is melted and compounded as it moves through barrel 75, and emerges from terminal end 86 as a molten thermoplastic composition.

Terminal end 86 of extruder 74 is in fluid communication with sheet die 77. Fluid communication between terminal end 86 and sheet die 77 is typically achieved by means of a conduit 89, and optionally an expander 92 that is in fluid communication with and interposed between conduit 89 and sheet die 77. Conduit 89 and optional expander 92 may each be independently heated. The molten thermoplastic composition is forwarded from terminal end 86 of extruder 74, through conduit 89 and expander 92, and into sheet die 77. Sheet die 77 typically includes at least one interior channel that is in fluid communication with expander 92 and a slot (not shown). Passage of the molten thermoplastic material through the interior channel(s) and slot of sheet die 77 results in formation of a heated thermoplastic sheet 95 having a first surface 98 and a second surface 101.

Sheet die 77 may be a dynamic sheet die having a plurality of gates 104 that may be controllably and reversibly moved, by separate actuators (not shown), across the slot of sheet die 77 so as to control the amount of molten thermoplastic material passing there-through, and accordingly the thickness, width and shape of the heated thermoplastic sheet emerging therefrom and produced thereby. Gates 104 may be operated so as to produce a heated thermoplastic sheet having openings (not shown) that are free of thermoplastic material. For example, as heated thermoplastic sheet 95 is formed, some of the gates 104 forming interior portions of the sheet, may be closed for a predetermined amount of time and then reopened, thereby resulting in openings or slots being formed in the sheet.

Rather than a slot, sheet die 77 may have a plurality of laterally aligned openings (not shown) through which the molten thermoplastic material emerges. The openings are positioned such that molten thermoplastic material emerging from one opening merges and becomes continuous with the molten thermoplastic material emerging from its adjacent/neighboring opening(s), thereby forming the heated thermoplastic sheet. The plurality of laterally aligned openings in effect acting as a slot with regard to formation of the heated thermoplastic sheet. Each opening may have a reversibly and controllably closeable gate 104 associated therewith.

Sheet die 77, and first mold portion 11 and the sheet retainers 35 may be positioned relative to each other in any suitable way, provided that the heated thermoplastic sheet 95 emerging from sheet die 77 may be contacted with each sheet retainer 35 and interior mold surface 14 of first mold portion 11. For example, sheet die 77 may be positioned so as to produce a heated thermoplastic sheet 95 that drops gravitationally downward (as depicted), and first mold portion 11 and the sheet retainers 35 may together be positioned vertically (not depicted) so as to be parallel with the plane of the gravitationally dropping heated thermoplastic sheet.

In an embodiment of the present invention and as depicted in the drawings, first mold portion 11 and each sheet retainer 35 are together positioned in a plane beneath sheet die 77, e.g., the plane defined by the x- and y-axes shown in FIG. 1. For purposes of reference, perimeter edge 17 lies substantially within the plane defined by the x- and y-axes of FIG. 1. As the heated thermoplastic sheet 95 is formed and drops vertically and gravitationally from sheet die 77: (i) sheet die 77 may be reversibly moveable above the plane in which first mold portion 11 and each sheet retainer 35 resides; and/or (ii) first mold portion 11 and each sheet retainer 35 may together be reversibly positionable in the plane beneath sheet die 77. Such relative movement of sheet die 77, and first mold portion 11 and each sheet retainer 35 provides for contact of second sheet surface 101 with interior mold surface 14 of first mold portion 11 and the upper surfaces 38 of each sheet retainer 35. Sheet die 77 may be reversibly moveable by known means, such as on tracks or rails (not shown).

In an embodiment of the present invention, first mold portion 11 and each sheet retainer 35 are together positioned and are reversibly moveable in a plane beneath sheet die 77, and sheet die 77 is substantially stationary.

To achieve reversible movement of first mold portion 11 and the sheet retainers 35 in concert in the plane beneath sheet die 77, first mold portion 11 and each sheet retainer 35 together reside on a platform 107. Typically, first mold portion 11 and the sheet retainers are fixedly attached to platform 107 (e.g., by fasteners, such as bolts—not shown). In an embodiment, and with regard to sheet retainers 35, base plates 47 of scissor jack apparatuses 45 are fixedly attached to platform 107. Platform 107 is positioned and reversibly moveable in the plane beneath sheet die 77 along the y-axis (e.g., as represented by the two headed arrow 110 of FIG. 1).

Platform 107 may be reversibly moveable in the plane beneath sheet die 77 by known locomotion means, such as skids, tracks, wheels alone, wheels in conjunction with rails, and combinations thereof. Platform 107 may further include a vertically positionable plate (not shown) on which first mold portion 11 and the sheet retainers 35 may together reside. The vertically positionable plate is reversibly positionable along the z-axis, thereby moving first mold portion 11 and the sheet retainers 35 together along the z-axis (e.g., vertically). Vertical movement of first mold portion 11 and the sheet retainers 35 may be undertaken for reasons including, but not limited to, positioning interior surface 14 of first mold portion 11 and exterior sheet retainer surfaces 38 closer to or further from sheet die 77, and more particularly closer to/further from the slot of sheet die 77 from which the heated thermoplastic sheet 95 emerges.

In the method of the present invention, each sheet retainer 35 is initially positioned such that the upper surface 38 thereof is located above perimeter edge 17 of first mold portion 14 (along the z-axis). See FIGS. 1 and 2. When the first mold portion is a first male mold portion (as depicted in the drawings), the initial position of the sheet retainers may be, in addition to being above the perimeter edge: (i) above the upper terminus of the interior mold surface of the first male mold portion; or (ii) above the perimeter edge and below the upper terminus of the interior mold surface of the first male mold portion. As depicted in the drawing figures, the sheet retainers 35 are initially positioned above perimeter edge 17 and below the upper terminus of interior mold surface 14. In the case of a female first mold portion (that is substantially recessed below the perimeter edge), the initial position of the sheet retainers is such that the upper surface of each is above the perimeter edge of the first female mold portion. As described previously herein, the sheet retainers are reversibly and controllably positionable along at least one of the x-, y- and z-axes, for example, substantially along the z-axis by means of scissor apparatuses 45.

A heated thermoplastic sheet (e.g., 95) having a first surface (e.g., 98) and a second surface (e.g., 101) is formed from at least one thermoplastic composition, in the method of the present invention. The heated thermoplastic sheet has a temperature that allows it to be thermoformable (e.g., a thermoformable temperature), in particular, when:

(i) contacted and retained on the upper surface of each sheet retainer; and (ii) contacted and drawn into intimate contoured contact with the interior mold surface of the first mold portion. While the temperature of the heated thermoplastic sheet may be equal to or greater than the melting point of the thermoplastic sheet, the temperature of the heated thermoplastic sheet is more typically within a range that is equal to or greater than the softening point (or glass transition temperature) of the thermoplastic sheet, and less than or equal to the melting point of the thermoplastic sheet (i.e., and equivalently, the softening point/Tg and melting point, respectively, of the thermoplastic composition from which the thermoplastic sheet is formed).

In an embodiment of the method of the present invention, the heated thermoplastic sheet has an interior portion that is interposed between the first and second surfaces of the heated thermoplastic sheet. The temperature of the heated thermoplastic sheet, in this embodiment, is substantially uniform (e.g., varying by less than or equal to 5° C., or more typically less than or equal to 2° C.) through the first surface, the interior portion and the second surface thereof. In particular, the temperature is substantially uniform when: (i) the first portion of the second surface of the heated thermoplastic sheet is drawn against the upper surface of each sheet retainer; and (ii) the second portion of the second surface of the heated thermoplastic sheet is drawn against the interior mold surface of the first mold portion.

The temperature of the heated thermoplastic sheet may be determined by art-recognized methods, such as contacting thermocouples with the first and second surfaces of the heated thermoplastic sheet, and inserting a thermocouple into the interior portion of the heated thermoplastic sheet. Alternatively, or in addition thereto, remote temperature sensors, such as an infrared sensor, may be used to determine the temperature of the first and second surfaces of the heated thermoplastic sheet.

As used herein and in the claims the term "sheet(s)" and similar terms, such as "sheet die(s)" are inclusive of the term "film(s)", and similar terms, such as "film die(s)". Upon emerging from the sheet die, and more particularly the slot of the sheet die, the heated thermoplastic sheet typically has a thickness of from 0.5 mm to 25 mm, more typically from 1.5 mm to 15 mm, and further typically from 6 mm to 12 mm. In an embodiment of the present invention, upon emerging from the sheet die, the heated thermoplastic sheet has a thickness of 9 mm. The shaped thermoplastic sheet of the molded article prepared by the method of the present invention, typically has a thickness of from 0.25 mm to 12.5 mm, more typically from 0.75 mm to 8 mm, and further typically from 3 mm to 6 mm. In an embodiment of the present invention, the shaped thermoplastic sheet of the molded article prepared by the method of the present invention has an average thickness of 4.5 mm.

The heated thermoplastic sheet may be formed by known methods that involve melting a thermoplastic composition so as to form a molten thermoplastic composition, and then forming a heated thermoplastic sheet from the molten thermoplastic composition. In an embodiment, and as described previously herein, the thermoplastic composition is melted in an extruder 75 (e.g., a single screw, or co- or counter-rotating twin screw extruder) having a feed end 80 having a feed port 83, and a terminal end 86. The terminal end of the extruder is in fluid communication with a sheet die 77 (e.g., by means of conduit 89 and expander 92). A molten thermoplastic composition is formed within the extruder and forwarded to (by means of conduit 89 and expander 92) and passed through sheet die 77, so as to form the heated thermoplastic sheet (e.g., 95). The heated thermoplastic sheet typically emerges from a slot in the sheet die, and drops vertically and gravitationally therefrom. The sheet die may be selected and operated in accordance with the description provided previously herein.

The heated thermoplastic sheet 95 emerges from sheet die 77 such that the second surface 101 thereof faces (e.g., is in facing opposition to) the sheet retainers 35 and interior mold surface 14 of first mold portion 11. The first surface 98 of heated thermoplastic sheet 95 faces away from the sheet retainers 35 and interior mold surface 14.

Figure 7:
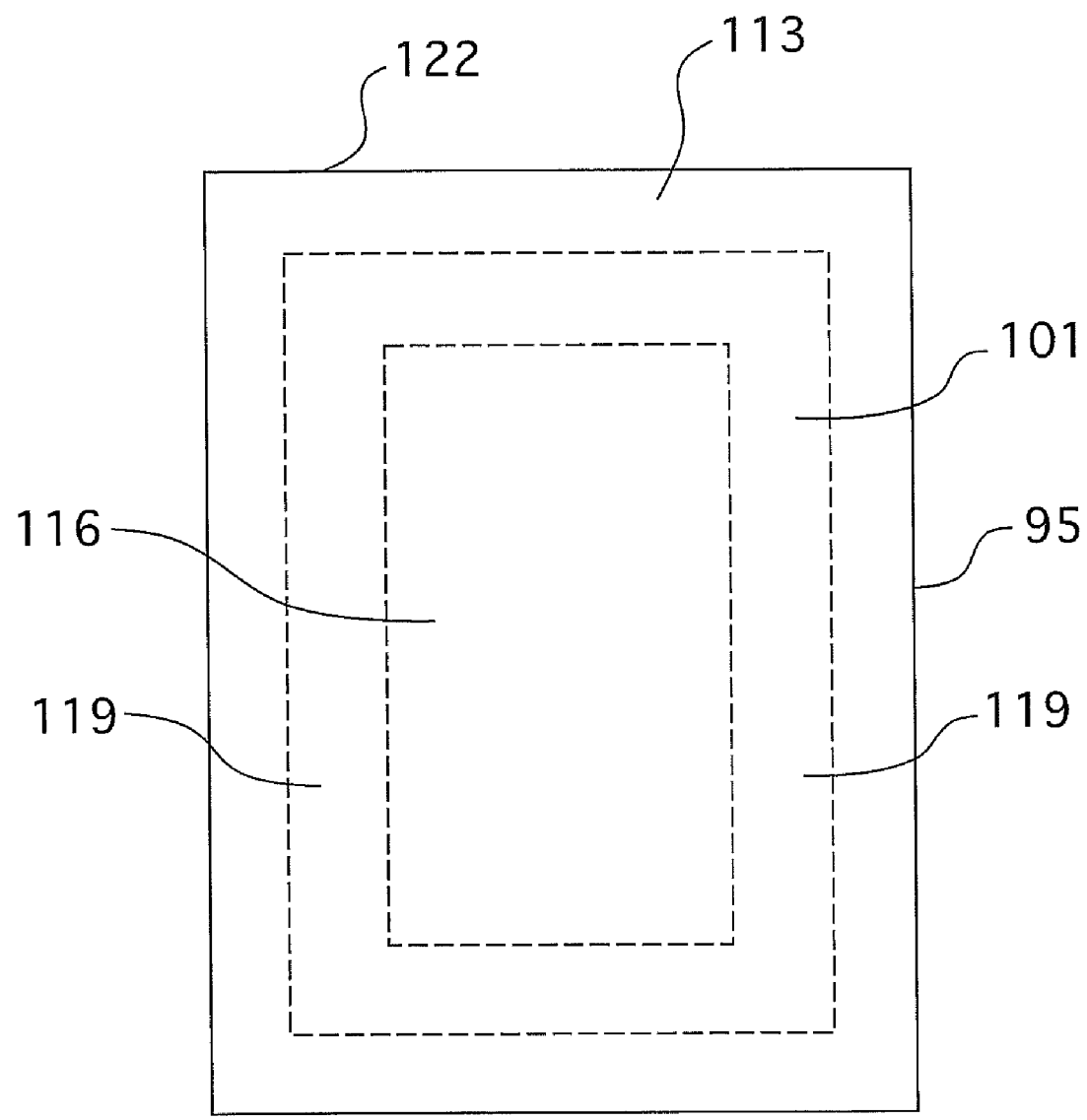
FIG. 7 is a representative plan view of the second surface of a heated thermoplastic sheet that is formed and used in the method of the present invention.

The second surface 101 of the heated thermoplastic sheet is described with regard to the present invention as having a first portion, a second portion, and a third portion. For purposes of illustration, and with reference to FIG. 7, first portion 113 of second surface 101 of heated thermoplastic sheet 95 is located generally near or towards the terminal edges 122 of sheet 95. Second portion 116 of second surface 101 is located generally in a central area of heated thermoplastic sheet 95. Third portion 119 of second surface 101 is located generally in an area between (e.g., interposed between) first portion 113 and second portion 116 of heated thermoplastic sheet 95.

A first portion of the second surface of the heated thermoplastic sheet is contacted with a portion of the upper surface of at least one sheet retainer. Typically, as the heated thermoplastic sheet is formed, it is sequentially contacted with portions of the upper surfaces of the sheet retainers.

Reduced pressure is drawn through at least some of the plurality of perforations 41 of upper surface 38 (e.g., by means of second vacuum apparatus 68 and conduit 71), so as to retain the first portion of the second surface of the heated thermoplastic sheet on the upper surface of each sheet retainer. The reduced pressure may be drawn through perforations 41 while the first portion of the second surface of the heated thermoplastic sheet is sequentially contacted with the upper surface of each sheet retainer, so as to sequentially retain the heated thermoplastic sheet on the upper sheet retainer surface as it is sequentially contacted there-with. Alternatively, the reduced pressure may be drawn through perforations 41 after all of the first portion of the second surface of the heated thermoplastic sheet is contacted with the upper surfaces of the sheet retainers.

A second portion (e.g., second portion 116) of the second surface (101) of the heated thermoplastic sheet (95) is contacted with at least a portion of the interior mold surface (e.g., 14) of the first mold portion (e.g., 11). Contact of the second portion of the second surface of the heated thermoplastic sheet with at least a portion of the interior mold surface of the first mold portion, may occur prior to, concurrently with or subsequently to contact (or reduced pressure retention) of the first portion of the second surface of the heated thermoplastic sheet with/on the upper surfaces of the sheet retainers. In an embodiment of the present invention, contact of the second portion of the second surface of the heated thermoplastic sheet with at least a portion of the interior mold surface of the first mold portion, occurs substantially concurrently with contact (or reduced pressure retention) of the first portion of the second surface of the heated thermoplastic sheet with/on the upper surfaces of the sheet retainers.

Prior to, concurrently with or subsequent to contact of the second portion of the second surface of the heated thermoplastic sheet with at least a portion of the interior mold surface of the first mold portion, the sheet retainers are independently (i) moved along the x-, y- and/or z-axis, and (ii) optionally rotated around their longitudinal axes, relative to the perimeter edge of the first mold portion. More particularly, with the first portion of the second surface of the heated thermoplastic sheet retained on at least a portion of the upper surface of each sheet retainer: (i) each sheet retainer is independently moved towards and/or away from the perimeter edge along the x-, y- and/or z-axes; and optionally (ii) each sheet retainer is independently rotated around its longitudinal axis towards and/or away from the perimeter edge of the first mold portion. Movement along the x-, y- and/or z-axes, and optional rotation, of the sheet retainers may be performed sequentially as recited, substantially concurrently, or sequentially in reverse of the recited order (i.e., movement along the x-, y- and/or z-axes occurring after rotation).

In an embodiment, the sheet retainers are moved in unison along the z-axis towards (e.g., down towards) the perimeter edge. The sheet retainers, with the heated thermoplastic sheet retained thereon, may be moved along the z-axis so as to be positioned below the perimeter edge of the first mold portion.

With at least a portion of the second portion of the second surface of the heated thermoplastic sheet in contact with at least a portion of the interior mold surface of the first mold portion, reduced pressure is drawn (e.g., by means of first vacuum apparatus 29 and conduit 32) through the plurality of perforations (e.g., 26) of the interior mold surface. The second portion of the second surface of the heated thermoplastic sheet is drawn (as a result of the reduced pressure) into intimate contact with and matches the contour of the interior mold surface.

The interior mold surface of the first mold portion may optionally be heated so as to assist matching of the second portion of the second surface of the heated thermoplastic sheet with the contoured interior mold surface. As a result of, however, the residual heat retained within the heated thermoplastic sheet (due to its use upon formation, e.g., upon exiting the sheet die), separately heating the interior mold surface of the first mold portion is typically not required in the method of the present invention. In addition, in light of the residual heat retained within the heated thermoplastic sheet, separate or external heating of the heated thermoplastic sheet is typically not required in the method of the present invention.

While maintained in intimate contour matching contact with the interior mold surface, the heated thermoplastic sheet is cooled. Cooling of the heated thermoplastic sheet results in the formation of a shaped thermoplastic sheet that retains the contour of the interior mold surface of the first mold portion. The heated thermoplastic sheet is typically cooled to a temperature that is less than the softening point or glass transition temperature of the thermoplastic sheet. When cooled to a temperature below its softening point or glass transition temperature, the thermoplastic sheet is no longer thermoformable, and as such retains the contoured shape of the interior mold surface.

Cooling of the heated and molded/shaped thermoplastic sheet may be achieved by known means. For example, cool air may be passed over the first surface of the heated thermoplastic sheet, and/or the interior mold surface of the first mold portion may be cooled (e.g., by means of a chilled fluid or coolant being passed through conduits located under the interior mold surface of the first mold portion—not shown). Alternatively, or in addition to such cooling methods, a chilled liquid, such as water (e.g., having a temperature of greater than 0° C. and less than or equal to 25° C.) may be contacted directly (e.g., by misting/atomizing) with at least a portion of the first surface of the heated and molded/shaped thermoplastic sheet.

After the thermoplastic sheet has been sufficiently cooled, the resulting shaped thermoplastic sheet (or molded article) is removed from the first mold portion. Removal of the shaped thermoplastic sheet from the first mold portion may be achieved by art-recognized methods. For example, one or more ejector cores may extend reversibly outward from the interior mold surface, in effect pushing the shaped thermoplastic sheet off of and away from the first mold portion. Alternatively, or in addition thereto, a gas (e.g., air) may be passed under pressure through the plurality of perforations (e.g., 26) in the interior mold surface, thereby lifting the shaped thermoplastic sheet off of and away from the first mold portion. Still further alternatively, or in addition thereto, the shaped thermoplastic sheet may be removed from the first mold portion by moving the sheet retainers (with the thermoplastic sheet retained thereon) and the first mold portion away from each other. For example, the sheet retainers with the excess thermoplastic sheet material retained therein, may be moved along the z-axis up and away from the first mold portion, thereby lifting the shaped thermoplastic sheet off of the first mold portion.

The excess portion of the thermoplastic sheet extending from the perimeter edge of the first mold portion to and onto at least a portion of the upper surfaces of the sheet retainers, is typically detached along the perimeter edge after the heated thermoplastic sheet has been drawn by reduced pressure into intimate contour matching contact with the interior mold surface of the first mold portion. The excess thermoplastic sheet material may be detached prior to or after the shaped thermoplastic sheet is removed from the first mold portion. Typically, the excess thermoplastic sheet material is detached prior to removal of the shaped thermoplastic sheet from the first mold portion.

The excess thermoplastic sheet material may optionally be detached after the shaped thermoplastic sheet is removed from the first mold portion. The excess thermoplastic sheet material may, for example, be used to secure and transport the shaped thermoplastic sheet during post-molding operations, such as sanding, applying labels, cutting holes, inserting attachments and/or painting. After completion of the post molding operations, the excess thermoplastic sheet material may then be detached from the shaped thermoplastic sheet.

Movement of the sheet retainers along the x-, y- and/or z-axes, and optional rotation thereof (with the heated thermoplastic sheet retained thereon) in the method of the present invention assists and enhances the intimate contour matching contact of the second portion of the second surface of the heated thermoplastic sheet with the interior mold surface of the first mold portion.

Figure 5:
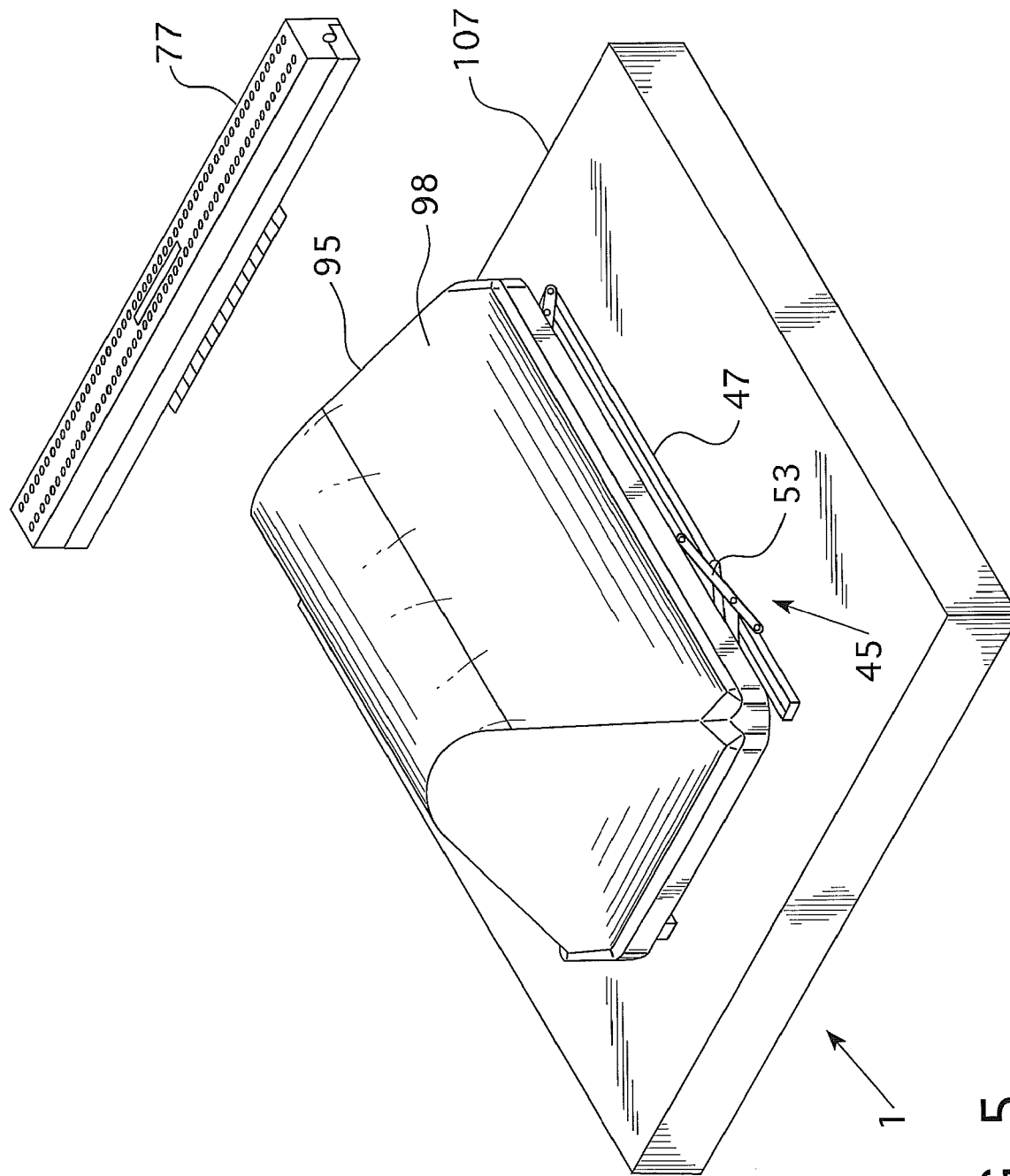
FIG. 5 is a representative perspective view of the sheet molding apparatus of FIG. 4, in which the sheet retainers have been moved downward with the heated thermoplastic sheet retained thereon by means of reduced pressure drawn through the perforations of the sheet retainers.
Figure 6:
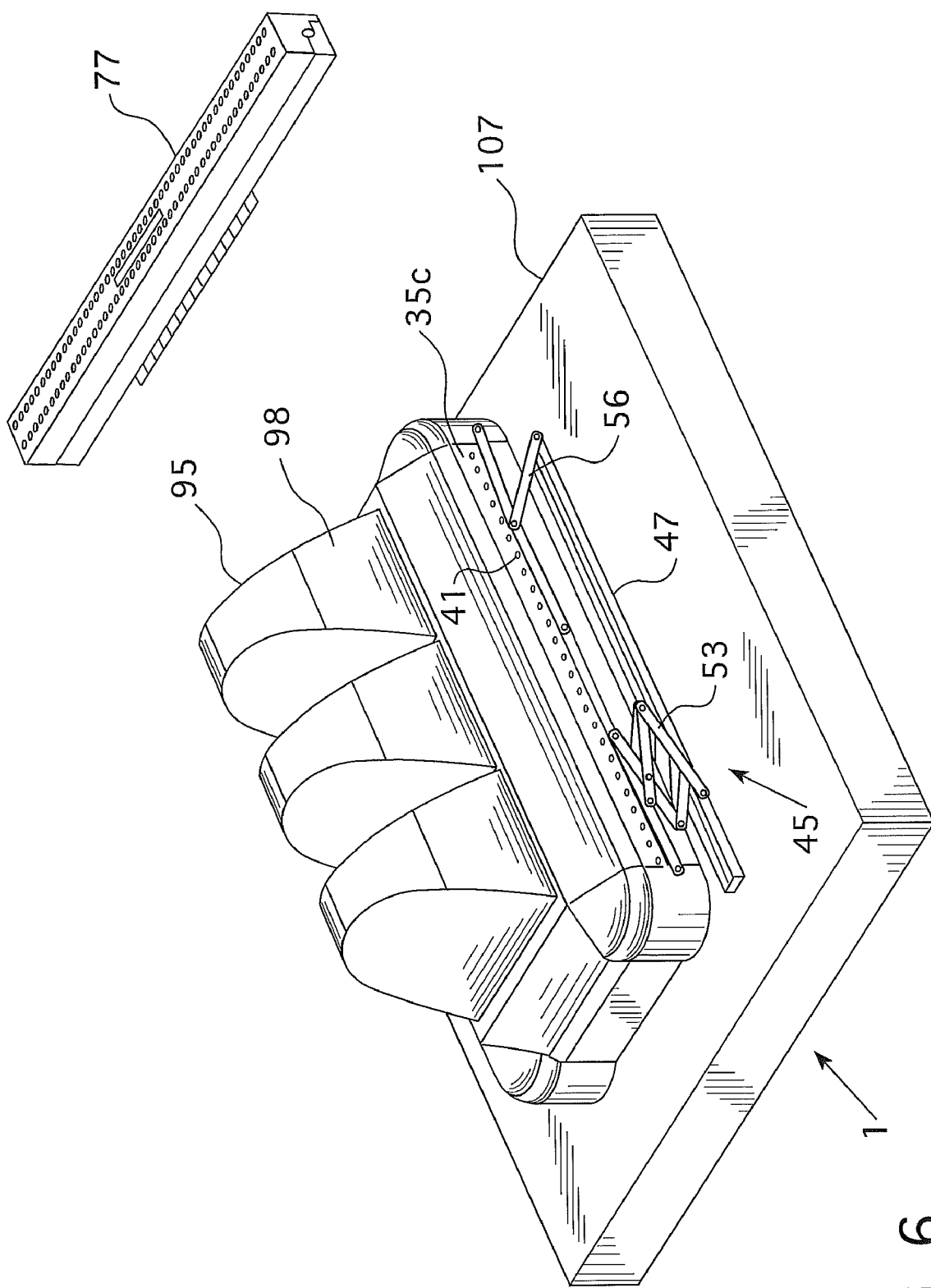
FIG. 6 is a representative perspective view of the sheet molding apparatus of FIG. 5 in which the heated thermoplastic sheet has been drawn by reduced pressure into contact with the interior surface of the first mold portion, and the sheet retainers have been rotated outward relative to the perimeter edge of the first mold portion.

For example, as depicted in FIG. 5, when the scissor jack apparatuses 45 are collapsed and the sheet retainers drop down (with the heated thermoplastic sheet retained thereon via reduced pressure) along the z-axis towards and past the perimeter edge 17 (not visible in FIG. 5), the heated thermoplastic sheet 95 is draped over substantially the entire interior mold surface 14 of first mold portion 11. With heated thermoplastic sheet 95 so draped, drawing reduced pressure through the perforations 26 in interior mold surface 14 efficiently draws the second portion (e.g., 116) of the second surface 101 of heated thermoplastic sheet 95 into intimate contour matching contact with interior mold surface 14. See, for example, FIG. 6.

Rotation of the sheet retainers serves in part to assist with controlling the thickness of the heated thermoplastic sheet as it is drawn down by reduced pressure into intimate contour matching contact with interior mold surface 14. In particular, rotating of the sheet retainers provides for the formation of a shaped thermoplastic sheet that has a more uniform thickness, than would be obtained in the absence of rotating sheet retainers. For example, rotating the sheet retainers outward or away from the perimeter edge may serve to, in part, prevent bunching or gathering of heated thermoplastic sheet material on the interior mold surface, which can lead to non-uniform sheet thicknesses in the final molded article. Rotating the sheet retainers outward or away from the perimeter edge is typically (though not exclusively) advantageous when the first mold portion has a male interior mold surface, the majority of which extends above (or outward from) the perimeter edge (as depicted in the drawings).

Rotating the sheet retainers inward or towards the perimeter edge may serve to, in part, prevent over-stretching or thinning resulting from too little heated thermoplastic sheet material being drawn down onto the interior mold surface. For example, as the sheet retainers are rotated toward the perimeter edge, more heated thermoplastic material is made available to be drawn down onto the interior mold surface. Rotating the sheet retainers inward or towards the perimeter edge is typically (though not exclusively) advantageous when the first mold portion has a female interior mold surface, the majority of which is recessed below the perimeter edge (not depicted in the drawings).

In the case of a first mold portion having a complex interior mold surface, for example having portions that may be characterized as male, and other portions that may be characterized as female, some sheet retainers may be rotated towards the perimeter edge, while other sheet retainers are rotated away from the perimeter edge. For example, those sheet retainers that are adjacent to male interior mold surface portions, may be rotated away from the perimeter edge; while those sheet retainers that are adjacent to female interior mold surface portions, may be rotated towards the perimeter edge.

As the heated thermoplastic sheet drops vertically and gravitationally from the sheet die, it may be subject to necking, which causes the width of the heated thermoplastic sheet to decrease. For purposes of illustration, and with reference to FIG. 8, heated thermoplastic sheet 95 is depicted as exhibiting the phenomenon of necking. As heated thermoplastic sheet 95 drops through vertical distance 137, a pre-necked portion 125 having an initial width 131 is formed. After heated thermoplastic sheet 95 drops further through vertical distance 140, the phenomenon of necking occurs and a transition portion 127 is formed having a variably decreasing width. After falling through distance 140, the necking phenomenon is complete and a necked portion 128 having a stabilized width of 134 is formed. Width 134 of necked portion 128 is smaller than width 131 of initial portion 125 of heated thermoplastic sheet 95. The width of the transition portion 127 is typically less than width 131 of initial portion 125, and greater than width 134 of necked portion 128 of the heated thermoplastic sheet.

The phenomenon of sheet necking may have numerous causes, including but not limited to, the molten thermoplastic composition, the configuration of the sheet die (e.g., the shape of its slot), the temperature of the heated thermoplastic sheet as it emerges from the sheet die, and combinations thereof. The phenomenon of necking is typically undesirable, since the resulting reduction in the width of the heated thermoplastic sheet usually necessitates the use of a wider, heavier and more expensive sheet die.

Figure 8:
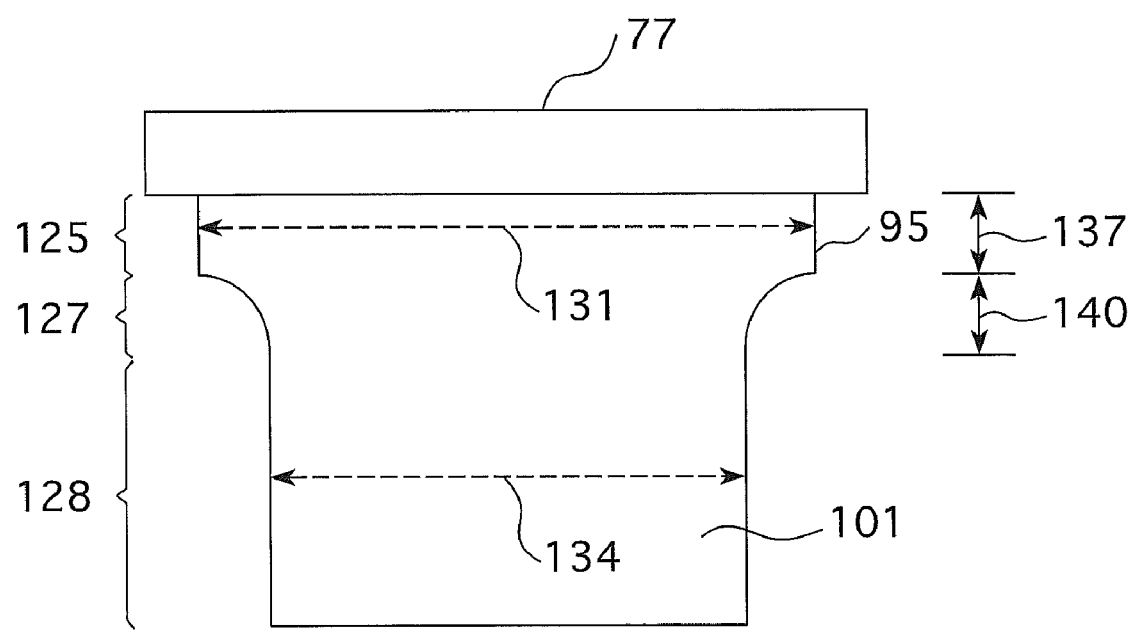
FIG. 8 is a representative elevational view of the second surface of a heated thermoplastic sheet as it emerges from the sheet die, in which the heated thermoplastic sheet exhibits necking.

In an embodiment of the present invention, the step of contacting the first portion of the second surface of the heated thermoplastic sheet with at least a portion of the upper surface of each sheet retainer occurs prior to necking of the heated thermoplastic sheet. Retaining the heated thermoplastic sheet on the upper surface of the sheet retainer prior to necking, substantially prevents necking of the heated thermoplastic sheet. With further reference to FIG. 8, for example, when the first portion of the second surface 101 of heated thermoplastic sheet 95 is contacted with and retained on at least a portion of the upper surface 38 of a sheet retainer 35 within vertical distance 137 (i.e., before necking occurs), necking of the heated thermoplastic sheet is substantially prevented, and the heated thermoplastic sheet retains its initial (non-necked) width 131.

As discussed previously with regard to the sheet molding apparatus, in an embodiment of the method of the present invention, the first mold portion and the sheet retainers are together positioned and moveable in a plane (e.g., the plane defined by the x- and y-axes of FIG. 1) beneath the sheet die, and the sheet die is substantially stationary. The first mold portion 11 and the sheet retainers 35 may both reside on a platform 107 that is moveable within the plane beneath sheet die 77, in accordance with the description previously provided herein. In this embodiment, the method further includes moving the first mold portion and the sheet retainers together in the plane beneath the sheet die as the thermoplastic sheet is formed, thereby facilitating contact between the heated thermoplastic sheet and the upper surface of each sheet retainer and the interior mold surface of the first mold portion. As the first mold portion and sheet retainers are moved beneath the sheet die, the heated thermoplastic sheet is in effect draped there-across. See, for example, FIGS. 1 through 4. With reference to FIG. 3, the linear speed at which the first mold portion 11 and sheet retainers 35 are moved beneath sheet die 77 (e.g., on platform 107 in the direction indicated by arrow 143), and the rate at which heated thermoplastic sheet 95 is produced from sheet die 77, may together be controlled so as to control the thickness of the heated thermoplastic sheet 95 as it is draped across the mold and sheet retainers. The rate of linear movement and rate of heated thermoplastic sheet formation may each be variably and independently controlled so as to vary the thickness of the heated thermoplastic sheet across the interior mold surface.

Figure 4:
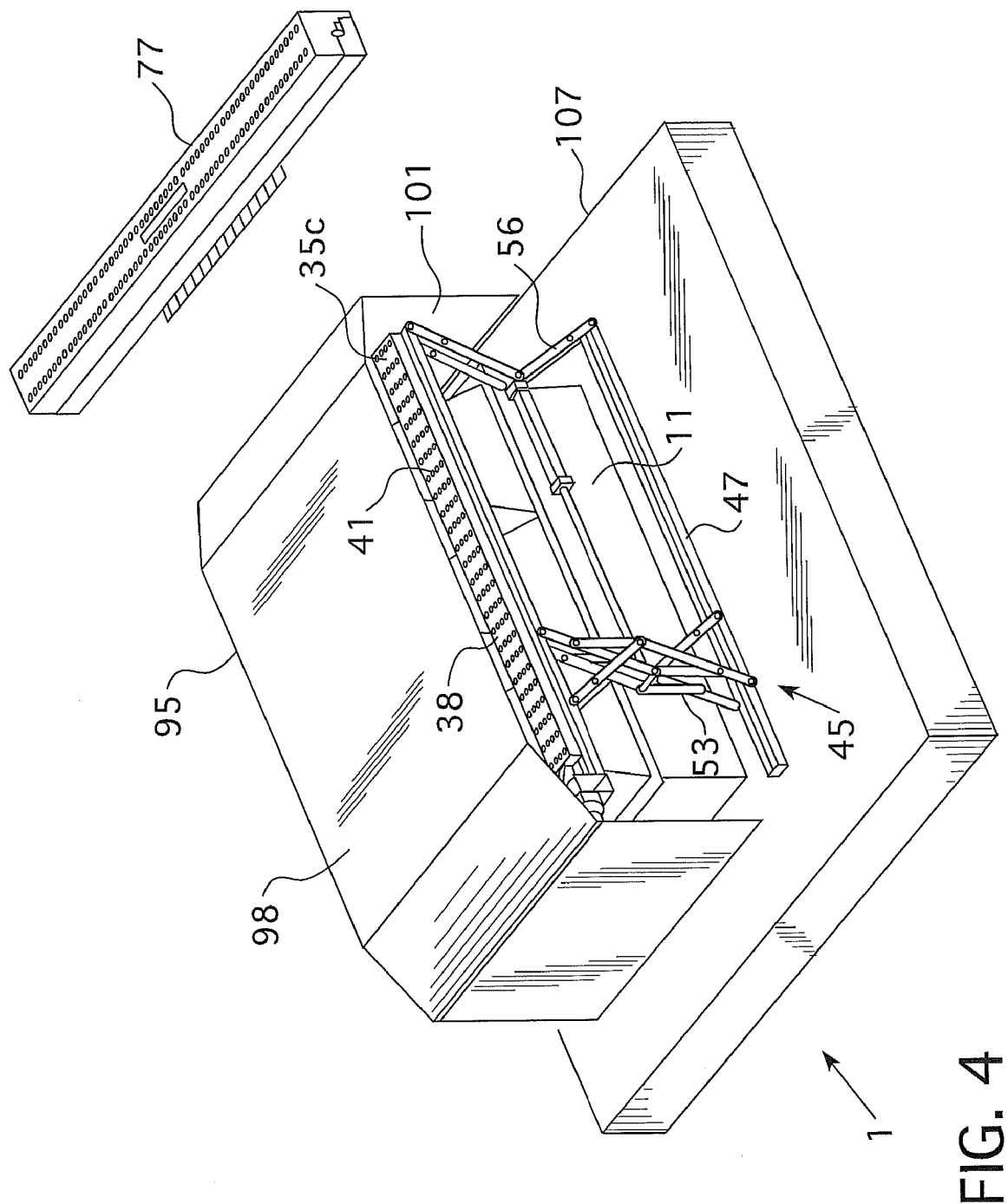
FIG. 4 is a representative perspective view of the sheet molding apparatus of FIG. 3, in which the heated thermoplastic sheet has been separated from the sheet die and drapes over the first mold portion and the sheet retainers.

In FIGS. 3 and 4, for purposes of clarity, heated thermoplastic sheet 95 is depicted as being rigid, so as to provide a view of the underlying sheet retainer 35c. Since heated thermoplastic sheet 95 has a temperature that is at least greater than its softening point, in practice, heated thermoplastic sheet 95 more typically drapes across a portion of interior mold surface 14 and/or at least one sheet retainer 35 (rather than rigidly residing there-over and/or thereon).

In the method of the present invention, the heated thermoplastic sheet is typically detached from the sheet die at some point after it has been draped across the interior mold surface and sheet retainers, and before the shaped thermoplastic sheet is removed from the first mold portion. In an embodiment, the method includes detaching the heated thermoplastic sheet from the sheet die prior to, concurrently with or after the step of: (i) moving each sheet retainer independently towards and/or away from the perimeter edge along the x-, y- and/or z-axes; and (ii) optionally rotating each sheet retainer around its longitudinal axis independently towards and/or away from the perimeter edge. With reference to FIG. 4, heated thermoplastic sheet 95 has been detached from sheet die 77 prior to rotating and moving the sheet retainers along the x-, y- and/or z-axes.

The sheet molding apparatus of the present invention may further include a second mold portion having an interior mold surface, in which case the method may further include the step of contacting compressively the interior mold surface of the second mold portion with the first surface of the heated thermoplastic sheet. Contact of the interior mold surface of the second mold portion with the first surface of the heated thermoplastic sheet, is performed: (i) after the second portion of the second surface of the heated thermoplastic sheet has been drawn into intimate contour matching contact with the interior mold surface of the first mold portion (by means of reduced pressure drawn through the perforations of the interior mold surface of the first mold portion); and (ii) before cooling of the heated thermoplastic sheet (and the corresponding formation of the shaped thermoplastic sheet).

Figure 9:
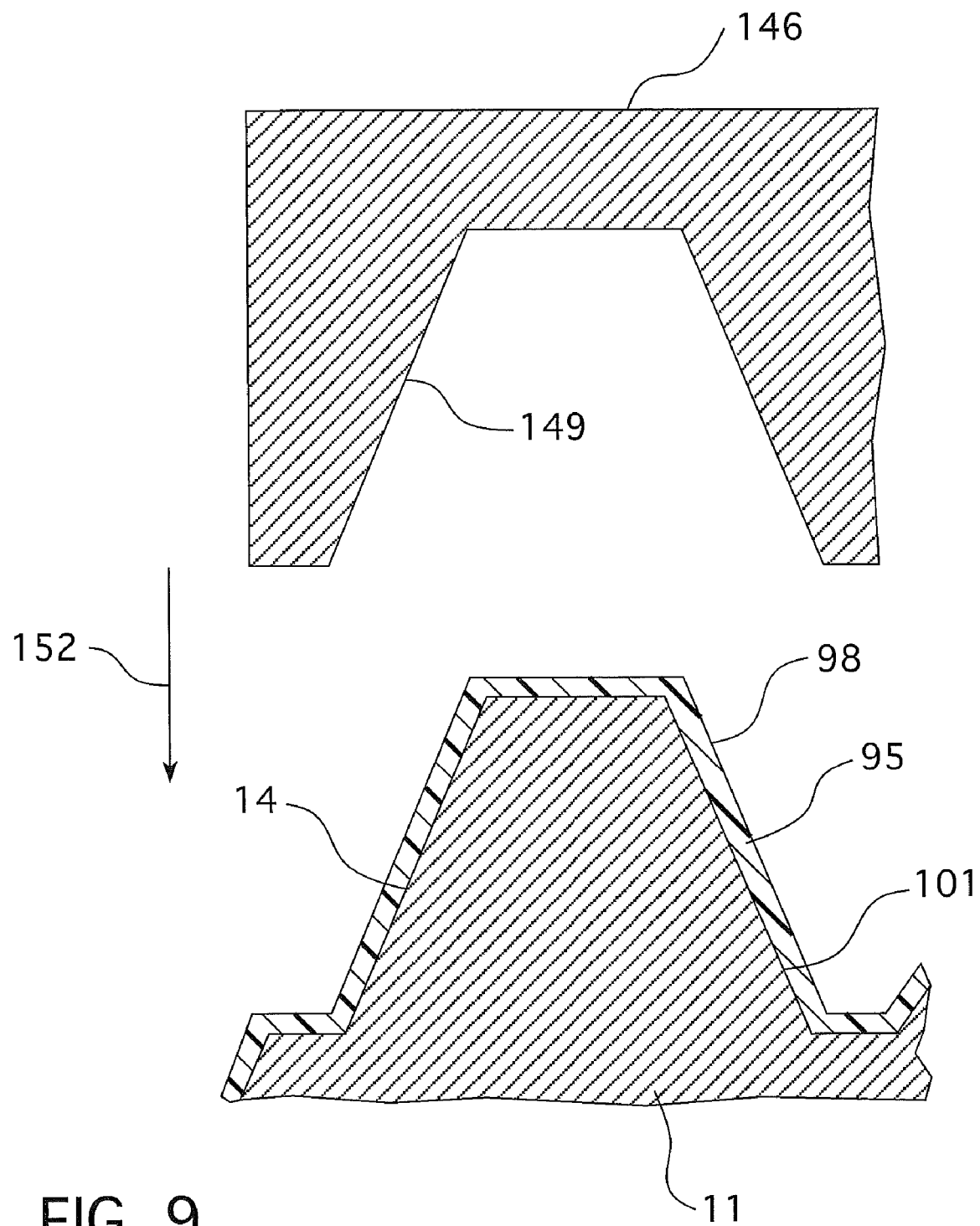
FIG. 9 is a partial side sectional view of the mold apparatus as depicted in FIG. 6, further including a second mold portion.

With reference to FIG. 9, second mold portion 146 has an interior mold surface 149. First mold portion 11 and second mold portion 146 are reversibly positionable relative to each other (e.g., along arrow 152), such that interior mold surface 14 of first mold portion 11 and interior mold portion 149 of second mold portion 146 are in reversibly positionable facing opposition relative to each other. More particularly, first surface 98 of heated thermoplastic sheet 95 and interior mold portion 149 of second mold portion 146 are in reversibly positionable facing opposition relative to each other (as depicted). When second mold portion 146 is moved in the direction represented by arrow 152 towards first mold portion 11, interior mold surface 149 of second mold portion 146 compressively contacts first surface 98 of heated thermoplastic sheet 95. Second mold portion 146 may be moved by known means, such as on vertical rails by means of a piston (not shown). Second mold portion 146 is typically located at a remote compression molding station relative to the heated thermoplastic sheet formation station (where sheet die 77 is located). Generally, platform 107 is moved by known locomotion means (e.g., on rails, as described previously herein) to the remote compression molding station, and second mold portion 146 is brought into compressive contact with first surface 98 of heated thermoplastic sheet 95.

Interior mold surface 149 of second mold portion 146 is typically brought into compressive contact with first surface 98 of heated thermoplastic sheet 95 at a compressive force of 1.0 Kg/cm$^2$ to 4.0 Kg/cm$^2$ (14 to 57 psi), more typically from 1.2 Kg/cm$^2$ to 2.0 Kg/cm$^2$ (17 to 28 psi), and further typically from 1.3 Kg/cm$^2$ to 1.8 Kg/cm$^2$ (19 to 27 psi). In an embodiment, interior mold surface 149 of second mold portion 146 is typically brought into compressive contact with first surface 98 of heated thermoplastic sheet 95 at a compressive force of 1.5 Kg/cm$^2$ (21 psi).

Contact of the interior mold surface of the second mold portion with the first surface of the heated thermoplastic sheet may be undertaken for reasons including, but not limited to: imparting surface features into the first surface of the heated thermoplastic sheet; controlling the thickness of the sheet; and/or smoothing the first surface of the sheet. The interior mold surface of the second mold portion may be smooth, or it may include raised and/or recessed portions.

Certain of the various steps of the method of the present invention, as discussed previously herein, may be performed sequentially as recited, concurrently, or in reverse order. In an embodiment of the present invention, the following steps are performed substantially sequentially as recited: (d) contacting the first portion of the second surface of the heated thermoplastic sheet with at least a portion of the upper surface of the sheet retainer; (e) drawing reduced pressure through the plurality of perforations of the upper surface of the sheet retainer, thereby retaining the first portion of the second surface of the heated thermoplastic sheet on the upper surface of the sheet retainer; (f) contacting the second portion of the second surface of the heated thermoplastic sheet with at least a portion of the interior mold surface of the first mold portion; and (g)(i) moving each sheet retainer independently towards and/or away from the perimeter edge, in each case independently along the x-, y- and/or z-axes; and (g)(ii) optionally rotating each sheet retainer, around its longitudinal axis, independently towards and/or away from the perimeter edge.

In a further embodiment of the present invention, the step of: (h) drawing reduced pressure through the plurality of perforations of the interior mold surface of the first mold portion (such that the second portion of the second surface of said heated thermoplastic sheet substantially matches the contour of the interior mold surface of said first mold portion); is performed concurrently or sequentially with the step of, (g)(i) moving each sheet retainer independently towards and/or away from the perimeter edge, in each case independently along the x-, y- and/or z-axes, and (g)(ii) optionally rotating each sheet retainer, around its longitudinal axis, independently towards and/or away from the perimeter edge.

The steps of (f) contacting the second portion of the second surface of the heated thermoplastic sheet with at least a portion of the interior mold surface of the first mold portion, and the step(s) (g) of moving each sheet retainer, may be performed sequentially as recited, substantially concurrently, or in reverse order. For example, in an embodiment, the step of (g)(i) moving each sheet retainer independently towards and/or away from the perimeter edge of the first mold portion, in each case independently along the x-, y- and/or z-axes, and (g)(ii) optionally rotating each sheet retainer, around its longitudinal axis, independently towards and/or away from the perimeter edge of the first mold portion; is performed prior to (e.g., sequentially prior to) the step of (f) contacting the second portion of the second surface of the heated thermoplastic sheet with at least a portion of the interior mold surface of the first mold portion.

In the method of the present invention, the step of drawing the second portion of the second surface of the heated thermoplastic sheet into intimate contoured contact (via reduced pressure) with the interior mold surface of the first mold portion may be assisted or enhanced by forming a seal between the second surface of the heated thermoplastic sheet and the perimeter edge of the first mold portion. In particular, a third portion (e.g., third portion 119 of FIG. 8) of the second surface of the heated thermoplastic sheet is contacted with the perimeter edge (and in particular the entire perimeter edge), thereby forming a seal between the third portion and the perimeter edge. After or concurrently with formation of the sheet-perimeter edge seal, the step of drawing reduced pressure through the perforations (e.g., 26) of the interior surface (e.g., 14) of the first mold portion may then be undertaken. A vacuum or near vacuum may be formed in the enclosed/sealed space defined by the second portion of the second surface of the heated thermoplastic sheet and the interior mold surface, as reduced pressure is drawn through the perforations of the interior mold surface. The formation of the vacuum or near vacuum, thus results in the heated thermoplastic sheet being efficiently drawn down onto the interior mold surface.

When the first portion of the second surface of the heated thermoplastic sheet is retained (by reduced pressure) on a portion of the upper surface of the sheet retainers, and the sheet retainers are rotated around their longitudinal axes, it is desirable to prevent the heated thermoplastic sheet from wrapping around (e.g., all the way around) the sheet retainer. If wrap-around occurs, removal of the thermoplastic sheet material from the sheet retainer may be difficult, rendering the sheet molding apparatus inoperable (at least until the thermoplastic sheet material is removed). Wrap-around is likely to occur if the sheet retainers are rotated through 360° or more (e.g., single or multiple rotations in the same direction). As such, the sheet retainers are more typically rotated through less than or equal to 180°, towards and/or away from the perimeter edge of the first mold portion, for a single sheet molding cycle. In an embodiment, each sheet retainer is independently rotated through less than or equal to 90° towards and/or away from the perimeter edge of the first mold portion. In the case of tubular sheet retainers, wrap-around may be further or alternatively prevented by fitting the tubular sheet retainers with doctor blades (not shown) at certain points (e.g., at the horizontal midpoint of each tubular sheet retainer) that serve to separate the heated thermoplastic sheet material from the upper surface as the tubular sheet retainers are rotated.

In the method of the present invention, the heated thermoplastic sheet is formed (e.g., by melt compounding/extrusion) from at least one thermoplastic composition. The thermoplastic composition includes at least one thermoplastic material. As used herein and in the claims, the term "thermoplastic material" and similar terms, means a plastic material that has a softening and melting point, and is substantially free of a three dimensional crosslinked network resulting from the formation of covalent bonds between chemically reactive groups, e.g., active hydrogen groups and free isocyanate groups. Examples of thermoplastic materials that may be included in the thermoplastic composition include, but are not limited to, thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polyolefins, thermoplastic (meth)acrylates, thermoplastic acrylonitrile-butadiene-styrene, thermoplastic styrene-acrylonitrile, thermoplastic acrylonitrile-stryrene-acrylate and combinations thereof (e.g., blends and/or alloys of at least two thereof).

In an embodiment of the present invention, the thermoplastic material of each thermoplastic composition is independently selected in each case from thermoplastic polyolefins. As used herein and in the claims, the term "polyolefin" and similar terms, such as "polyalkylene" and "thermoplastic polyolefin," means polyolefin homopolymers, polyolefin copolymers, homogeneous polyolefins and/or heterogeneous polyolefins. For purposes of illustration, examples of a polyolefin copolymers include those prepared from ethylene and one or more $C_3$-$C_{12}$ alpha-olefin, such as 1-butene, 1-hexene and/or 1-octene.

The polyolefins, from which the thermoplastic material of each thermoplastic composition, may in each case be independently selected include, but are not limited to, heterogeneous polyolefins, homogeneous polyolefins, and combinations thereof. The term "heterogeneous polyolefin" and similar terms means polyolefins having a relatively wide variation in: (i) molecular weight amongst individual polymer chains (i.e., a polydispersity index of greater than or equal to 3); and (ii) monomer residue distribution (in the case of copolymers) amongst individual polymer chains. The term "polydispersity index" (PDI) means the ratio of $M_w/M_n$, where $M_w$ means weight average molecular weight, and $M_n$ means number average molecular weight, each being determined by means of gel permeation chromatography (GPC) using appropriate standards, such as polyethylene standards. Heterogeneous polyolefins are typically prepared by means of Ziegler-Natta type catalysis in heterogeneous phase.

The term "homogeneous polyolefin" and similar terms means polyolefins having a relatively narrow variation in: (i) molecular weight amongst individual polymer chains (i.e., a polydispersity index of less than 3); and (ii) monomer residue distribution (in the case of copolymers) amongst individual polymer chains. As such, in contrast to heterogeneous polyolefins, homogeneous polyolefins have similar chain lengths amongst individual polymer chains, a relatively even distribution of monomer residues along polymer chain backbones, and a relatively similar distribution of monomer residues amongst individual polymer chain backbones. Homogeneous polyolefins are typically prepared by means of single-site, metallocene or constrained-geometry catalysis. The monomer residue distribution of homogeneous polyolefin copolymers may be characterized by composition distribution breadth index (CDBI) values, which are defined as the weight percent of polymer molecules having a comonomer residue content within 50 percent of the median total molar comonomer content. As such, a polyolefin homopolymer has a CDBI value of 100 percent. For example, homogenous polyethylene/alpha-olefin copolymers typically have CDBI values of greater than 60 percent or greater than 70 percent. Composition distribution breadth index values may be determined by art recognized methods, for example, temperature rising elution fractionation (TREF), as described by Wild et al, Journal of Polymer Science, Poly. Phys. Ed., Vol. 20, p. 441 (1982), or in U.S. Pat. No. 4,798,081, or in U.S. Pat. No. 5,089,321. An example of homogeneous ethylene/alpha-olefin copolymers are SURPASS polyethylenes, commercially available from NOVA Chemicals Inc.

The thermoplastic material of each thermoplastic composition may independently and optionally include a reinforcing material selected, for example, from glass fibers, glass beads, carbon fibers, metal flakes, metal fibers, polyamide fibers (e.g., KEVLAR polyamide fibers), cellulosic fibers, nanoparticulate clays, talc and mixtures thereof. If present, the reinforcing material is typically present in a reinforcing amount, e.g., in an amount of from 5 percent by weight to 60 or 70 percent by weight, based on the total weight of the thermoplastic material. The reinforcing fibers, and the glass fibers in particular, may have sizings on their surfaces to improve miscibility and/or adhesion to the thermoplastic materials into which they are incorporated, as is known to the skilled artisan.

In an embodiment of the invention, the reinforcing material is in the form of fibers (e.g., glass fibers, carbon fibers, metal fibers, polyamide fibers, cellulosic fibers and combinations of two or more thereof). The fibers typically have lengths (e.g., average lengths) of from 0.5 inches to 4 inches (1.27 cm to 10.16 cm). The thermoplastic sheet may include fibers having lengths that are at least 50 or 85 percent of the lengths of the fibers that are present in the feed materials from which the thermoplastic sheet is prepared, such as from 0.25 inches to 2 or 4 inches (0.64 cm to 5.08 or 10.16 cm). The average length of fibers present in the thermoplastic sheet may be determined in accordance with art recognized methods. For example, the thermoplastic sheet may be pyrolyzed to remove the thermoplastic material, and the remaining or residual fibers microscopically analyzed to determine their average lengths, as is known to the skilled artisan.

Fibers are typically present in the thermoplastic composition, and accordingly the thermoplastic sheet, in amounts selected independently from 5 to 70 percent by weight, 10 to 60 percent by weight, or 30 to 50 percent by weight (e.g., 40 percent by weight), based on the total weight of the thermoplastic sheet (i.e., the weight of the thermoplastic material, the fiber and any additives). Accordingly, the shaped thermoplastic sheet prepared by the method of the present invention may include fibers in amounts of from 5 to 70 percent by weight, 10 to 60 percent by weight, or to 50 percent by weight (e.g., 40 percent by weight), based on the total weight of the thermoplastic sheet.

The fibers may have a wide range of diameters. Typically, the fibers have diameters of from 1 to 20 micrometers, or more typically from 1 to 9 micrometers. Generally each fiber comprises a bundle of individual filaments (or monofilaments). Typically, each fiber is composed of a bundle of 10,000 to 20,000 individual filaments.

Typically, the fibers are uniformly distributed throughout the thermoplastic material of the thermoplastic sheet. During mixing of the fibers and the thermoplastic material, the fibers generally form bundles of fibers typically comprising at least 5 fibers per fiber bundle, and preferably less than 10 fibers per fiber bundle. While not intending to be bound by theory, it is believed based on the evidence at hand, that fiber bundles containing 10 or more fibers may result in a molded article (shaped thermoplastic sheet) having undesirably reduced structural integrity. The level of fiber bundles containing 10 or more fibers per bundle, may be quantified by determining the Degree of Combing present within a molded article. The number of fiber bundles containing 10 or more fibers per bundle is typically determined by microscopic evaluation of a cross section of the molded article, relative to the total number of microscopically observable fibers (which is typically at least 1000). The Degree of Combing is calculated using the following equation: 100×((number of bundles containing 10 or more fibers)/(total number of observed fibers)). Generally, the heated thermoplastic sheet and the shaped thermoplastic sheet each have a Degree of Combing of less than or equal to 60 percent, and typically less than or equal to 35 percent.

In addition or alternatively to reinforcing material(s), the thermoplastic composition(s), from which the heated thermoplastic sheet is prepared, may optionally include one or more additives. Additives that may be present in the thermoplastic composition include, but are not limited to, antioxidants, colorants, e.g., pigments and/or dyes, mold release agents, fillers, e.g., calcium carbonate, ultraviolet light absorbers, fire retardants and mixtures thereof. Additives may be present in the thermoplastic composition in functionally sufficient amounts, e.g., in amounts independently from 0.1 percent by weight to 10 percent by weight, based on the total weight of the thermoplastic composition.

In the method of the present invention, the heated thermoplastic sheet may be longitudinally and/or transversely stretched by rotation and/or movement of the sheet retainers along the x-, y- and/or z-axes, while the heated thermoplastic sheet is between its glass transition temperature and below its melting temperature. During the stretching operations, the polymer molecules of the heated thermoplastic sheet, in the solid state, may become orientated in the stretching direction, thereby resulting in improved or increased physical properties (e.g., compressive strength) along the stretching direction. As such, the shaped thermoplastic sheet formed in accordance with the method of the present invention may exhibit uniaxial or biaxial orientation (relative to the polymer molecules). In addition, when the thermoplastic composition includes fibers, such as glass fibers, stretching of the heated thermoplastic sheet (by rotation and/or movement of the sheet retainers along the x-, y- and/or z-axes) may also serve to orient the glass fibers uniaxilly or biaxially, thereby providing the shaped thermoplastic sheet with improved or increased physical properties along the stretching direction. Accordingly, the shaped thermoplastic sheet formed in accordance with the method of the present invention may alternatively or additionally exhibit uniaxial or biaxial fiber orientation.

In an embodiment of the method of the present invention, the heated thermoplastic sheet is a heated multilayer thermoplastic sheet having at least two thermoplastic layers, and accordingly the shaped thermoplastic sheet is a shaped multilayer thermoplastic sheet. Each thermoplastic layer may be formed from a separate thermoplastic composition. For example, each thermoplastic composition may be melt compounded so as to form separate molten thermoplastic compositions that are each separately fed into a multilayer sheet die, in accordance with art-recognized methods. The multilayer sheet die forms a heated multilayer thermoplastic sheet from the molten thermoplastic compositions fed therein.

Shaped thermoplastic sheets (or molded articles) that may be prepared in accordance with the method of the present invention may have complex 3-dimensional shapes, or relatively simple shapes, such as panels (e.g., wall panels, or wall panel covers). Molded articles that may be prepared according to the method of the present invention, include but are not limited to, storm drains, culverts, storage structures, support structures or platforms (e.g., pallets) and shelters (e.g., shelters for domestic pets, such as dogs and cats).

The present invention has been described with reference to specific details of particular embodiments thereof. It is not intended that such detailed be regarded as limitations upon the scope of the invention except insofar as and to the extent that they are included in the accompanying claims.

What is claimed is:

1. A method of preparing a molded article comprising:
   (a) providing a mold apparatus comprising,
      (i) a first mold portion having an interior mold surface, and a perimeter edge, said interior mold surface having a contour and a plurality of perforations, and
      (ii) at least one sheet retainer having an upper surface, at least a portion of the upper surface of said sheet retainer having a plurality of perforations, said sheet retainer having a longitudinal axis that is oriented along at least a portion of said perimeter edge, said sheet retainer being reversibly and controllably positionable along at least one of an x-axis, a y-axis and a z-axis relative to said perimeter edge, and said sheet retainer being rotatable around said longitudinal axis;
   (b) positioning said sheet retainer such that the upper surface of said sheet retainer is located above said perimeter edge;
   (c) forming, from at least one thermoplastic composition, a heated thermoplastic sheet having a temperature that allows said heated thermoplastic sheet to be thermoformable, said heated thermoplastic sheet having a first surface and a second surface;
   (d) contacting a first portion of said second surface of said heated thermoplastic sheet with at least a portion of the upper surface of said sheet retainer;

(e) drawing reduced pressure through said plurality of perforations of said upper surface of said sheet retainer, thereby retaining said first portion of said second surface of said heated thermoplastic sheet on the upper surface of said sheet retainer;

(f) contacting a second portion of the second surface of said heated thermoplastic sheet with at least a portion of the interior mold surface of said first mold portion;

(g) (i) moving each sheet retainer independently at least one of towards said perimeter edge and away from said perimeter edge, in each case independently along at least one of said x-axis, said y-axis and said z-axis, and (ii) optionally rotating each sheet retainer, around said longitudinal axis of said sheet retainer, independently at least one of towards said perimeter edge and away from said perimeter edge;

(h) drawing reduced pressure through said plurality of perforations of said interior mold surface of said first mold portion, such that said second portion of said second surface of said heated thermoplastic sheet substantially matches said contour of said interior mold surface of said first mold portion;

(i) cooling said heated thermoplastic sheet thereby forming a shaped thermoplastic sheet that retains said contour of said interior mold surface of said first mold portion; and (j) removing said shaped thermoplastic sheet from said first mold portion, wherein said shaped thermoplastic sheet is said molded article.

2. The method of claim 1 wherein said heated thermoplastic sheet has an interior portion interposed between said first surface and said second surface of said heated thermoplastic sheet, said temperature of said heated thermoplastic sheet is substantially uniform through said first surface, said interior portion and said second surface of said heated thermoplastic sheet, when said first portion of said second surface of said heated thermoplastic sheet is drawn against the upper surface of said sheet retainer, and when said second portion of said second surface of said heated thermoplastic sheet is drawn against the interior mold surface of said first mold portion.

3. The method of claim 1 further comprising, melting said thermoplastic composition in an extruder thereby forming a molten thermoplastic composition, said extruder having a terminal end that is in fluid communication with a sheet die, and passing said molten thermoplastic composition through said sheet die, thereby forming said heated thermoplastic sheet.

4. The method of claim 3 wherein the step of contacting said first portion of said second surface of said heated thermoplastic sheet with at least a portion of the upper surface of said sheet retainer occurs prior to necking of said heated thermoplastic sheet, and further wherein, retention of said first portion of said second surface of said heated thermoplastic sheet on the upper surface of said sheet retainer substantially prevents necking of said heated thermoplastic sheet.

5. The method of claim 3 wherein said first mold portion and said sheet retainer are together moveable in a plane beneath said sheet die, and said sheet die is substantially stationary, said method further comprising moving said first mold portion and said sheet retainer together in said plane beneath said sheet die as said thermoplastic sheet is formed, thereby facilitating contact between said heated thermoplastic sheet and said upper surface of said sheet retainer and said interior mold surface of said first mold portion.

6. The method of claim 3 further comprising detaching said heated thermoplastic sheet from said sheet die one of prior to, concurrently with and after the step of, (g) (i) moving each sheet retainer independently at least one of towards said perimeter edge and away from said perimeter edge, in each case independently along at least one of said x-axis, said y-axis and said z-axis, and (ii) optionally rotating each sheet retainer, around said longitudinal axis of said sheet retainer, independently at least one of towards said perimeter edge and away from said perimeter edge.

7. The method of claim 1 wherein each sheet retainer independently has a plate shape, and is a plate sheet retainer having an interior edge and an exterior edge, said interior edge of said plate sheet retainer being closer to said perimeter edge of said first mold portion.

8. The method of claim 1 wherein said upper surface of each sheet retainer independently has a contour selected from the group consisting of flat contours, convex contours, concave contours and combinations thereof.

9. The method of claim 1 wherein said sheet retainer comprises at least one further surface, each further surface being other than said upper surface, and each further surface being substantially free of perforations.

10. The method of claim 9 wherein at least one sheet retainer is a tubular sheet retainer, each tubular sheet retainer having a cross-sectional shape selected independently from the group consisting of polygonal shapes, circles, ovals, irregular shapes and combinations thereof.

11. The method of claim 1 wherein said mold apparatus further comprises a second mold portion having an interior mold surface, said method further comprising contacting compressively said interior mold surface of said second mold portion with said first surface of said heated thermoplastic sheet, after said second portion of said second surface of said heated thermoplastic sheet has been drawn into contact with the interior mold surface of said first mold portion, and before cooling of said heated thermoplastic sheet.

12. The method of claim 1 wherein said the steps of, (d) contacting said first portion of said second surface of said heated thermoplastic sheet with at least a portion of the upper surface of said sheet retainer, (e) drawing reduced pressure through said plurality of perforations of said upper surface of said sheet retainer, thereby retaining said first portion of said second surface of said heated thermoplastic sheet on the upper surface of said sheet retainer, (f) contacting a second portion of the second surface of said heated thermoplastic sheet with at least a portion of the interior mold surface of said first mold portion; and (g) (i) moving each sheet retainer independently at least one of towards said perimeter edge and away from said perimeter edge, in each case independently along at least one of said x-axis, said y-axis and said z-axis, and (ii) optionally rotating each sheet retainer, around said longitudinal axis of said sheet retainer, independently at least one of towards said perimeter edge and away from said perimeter edge;

are performed substantially sequentially.

13. The method of claim 1 wherein the step of, (h) drawing reduced pressure through said plurality of perforations of said interior mold surface of said first mold portion, such that said second portion of said second surface of said heated thermoplastic sheet substantially matches said contour of said interior mold surface of said first mold portion, is performed one of concurrently and sequentially with the step of, (g) (i) moving each sheet retainer independently at least one of towards said perimeter edge and away from said perimeter edge, in each case independently along at least one of said x-axis, said y-axis and said z-axis, and (ii) optionally rotating each sheet retainer, around said longitudinal axis of said sheet retainer, independently at least one of towards said perimeter edge and away from said perimeter edge.

14. The method of claim 1 further comprising, contacting a third portion of said second surface of said heated thermoplastic sheet with said perimeter edge of said first mold portion, thereby forming a seal between said third portion of said second surface of said heated thermoplastic sheet and said perimeter edge, and then subsequently performing the step of, (h) drawing reduced pressure through said plurality of perforations of said interior mold surface of said first mold portion, such that said second portion of said second surface of said heated thermoplastic sheet substantially matches said contour of said interior mold surface of said first mold portion.

15. The method of claim 1 wherein each thermoplastic composition comprises a thermoplastic material selected independently from the group consisting of thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polyolefins, thermoplastic (meth)acrylates, thermoplastic acrylonitrile-butadiene-styrene, thermoplastic styrene-acrylonitrile, thermoplastic acrylonitrile-styrene-acrylate and combinations thereof.

16. The method of claim 1 wherein each thermoplastic composition comprises a reinforcing material selected independently from the group consisting of glass fibers, glass beads, carbon fibers, metal flakes, metal fibers, polyamide fibers, cellulosic fibers, nanoparticulate clays, talc and mixtures thereof.

17. The method of claim 16 wherein said reinforcing material is selected from glass fibers having a length of 1.27 cm to 10.16 cm.

18. The method of claim 1 wherein said heated thermoplastic sheet is a heated multilayer thermoplastic sheet comprising at least two thermoplastic layers.

* * * * *